United States Patent
Ishii et al.

(10) Patent No.: US 12,163,207 B2
(45) Date of Patent: Dec. 10, 2024

(54) CUBIC BORON NITRIDE SINTERED MATERIAL AND CUTTING TOOL INCLUDING SAME

(71) Applicants: SUMITOMO ELECTRIC INDUSTRIES, LTD., Osaka (JP); SUMITOMO ELECTRIC HARDMETAL CORP., Hyogo (JP)

(72) Inventors: Akito Ishii, Osaka (JP); Yuichiro Watanabe, Osaka (JP); Katsumi Okamura, Osaka (JP); Yoshiki Asakawa, Hyogo (JP); Akihiko Ueda, Hyogo (JP); Satoru Kukino, Hyogo (JP); Hisaya Hama, Hyogo (JP)

(73) Assignees: Sumitomo Electric Industries, Ltd., Osaka (JP); SUMITOMO ELECTRIC HARDMETAL CORP., Hyogo (JP)

(*) Notice: Subject to any disclaimer, the term of this patent is extended or adjusted under 35 U.S.C. 154(b) by 0 days.

(21) Appl. No.: 18/011,713

(22) PCT Filed: Jul. 30, 2021

(86) PCT No.: PCT/JP2021/028501
§ 371 (c)(1),
(2) Date: Dec. 20, 2022

(87) PCT Pub. No.: WO2022/025291
PCT Pub. Date: Feb. 3, 2022

(65) Prior Publication Data
US 2023/0227949 A1    Jul. 20, 2023

(30) Foreign Application Priority Data
Jul. 31, 2020   (JP) ................. 2020-130674

(51) Int. Cl.
| | | |
|---|---|---|
| C22C 26/00 | (2006.01) |
| B22F 1/142 | (2022.01) |
| B22F 3/10 | (2006.01) |
| B22F 5/00 | (2006.01) |
| B22F 9/04 | (2006.01) |
| C22C 1/051 | (2023.01) |

(52) U.S. Cl.
CPC .............. *C22C 26/00* (2013.01); *B22F 1/142* (2022.01); *B22F 3/10* (2013.01); *B22F 9/04* (2013.01); *C22C 1/051* (2013.01); *B22F 2005/001* (2013.01); *B22F 2009/042* (2013.01); *B22F 2009/043* (2013.01); *B22F 2201/20* (2013.01); *B22F 2202/13* (2013.01); *B22F 2301/052* (2013.01); *B22F 2301/15* (2013.01); *B22F 2301/205* (2013.01); *B22F 2302/10* (2013.01); *B22F 2302/20* (2013.01); *B22F 2302/205* (2013.01); *C22C 2026/003* (2013.01)

(58) Field of Classification Search
CPC ... C22C 1/051; C22C 26/00; C22C 2026/003; B22F 1/142; B22F 3/10; B22F 9/04; B22F 2005/001; B22F 2009/042; B22F 2009/043; B22F 2201/20; B22F 2202/13; B22F 2301/052; B22F 2301/15; B22F 2301/205; B22F 2302/10; B22F 2302/20; B22F 2302/205; C04B 35/00; C04B 35/5831
See application file for complete search history.

(56) References Cited

U.S. PATENT DOCUMENTS

| | | | |
|---|---|---|---|
| 5,328,875 A * | 7/1994 | Ueda ............. | B23B 27/148 501/87 |
| 2008/0214383 A1 | 9/2008 | Matsukawa et al. | |
| 2016/0052827 A1 | 2/2016 | Matsuda et al. | |
| 2019/0002354 A1 | 1/2019 | Takahama et al. | |
| 2019/0076920 A1 * | 3/2019 | Ishii ............... | C22C 29/04 |
| 2020/0130061 A1 * | 4/2020 | Okamura .......... | C04B 35/58014 |

FOREIGN PATENT DOCUMENTS

| | | | |
|---|---|---|---|
| JP | 2011-207688 A | 10/2011 | |
| WO | WO-9217618 A1 * | 10/1992 | ........ C04B 35/5831 |
| WO | 2005/066381 A1 | 7/2005 | |
| WO | 2018/092369 | 5/2018 | |

* cited by examiner

*Primary Examiner* — Pegah Parvini
(74) *Attorney, Agent, or Firm* — Renner, Otto, Boisselle & Sklar, LLP

(57) ABSTRACT

A cubic boron nitride sintered material includes cubic boron nitride and a binder. The binder includes a first material and a second material. The first material is one or two or more first chemical species each including at least one first metallic element selected from the group consisting of tungsten, cobalt, and aluminum. Each of the first chemical species is a metal, an alloy, an intermetallic compound, a compound, or a solid solution. The second material is one or two or more second chemical species each including at least one second metallic element selected from the group consisting of titanium, zirconium, hafnium, vanadium, niobium, tantalum, and chromium. Each of the second chemical species is a solid solution derived from at least one selected from the group consisting of nitride, carbide, and carbonitride. In each of the second chemical species, 0.1 atom % to 10 atom % of aluminum is dissolved.

14 Claims, No Drawings

CUBIC BORON NITRIDE SINTERED MATERIAL AND CUTTING TOOL INCLUDING SAME

TECHNICAL FIELD

The present disclosure relates to a cubic boron nitride sintered material and a cutting tool including the same. This application claims priority based on Japanese Patent Application No. 2020-130674 filed on Jul. 31, 2020, and the entire contents of the Japanese patent application are incorporated herein by reference.

BACKGROUND ART

As a high-hardness material used for a cutting tool or the like, there is a cubic boron nitride sintered material (hereinafter also referred to as a "cBN sintered material"). The cBN sintered material is usually composed of cubic boron nitride grains (hereinafter also referred to as "cBN grains") and a binder, and its characteristics tend to differ depending on the content ratio of the cBN grains.

Therefore, in the field of cutting processing, different types of cBN sintered material applied to a cutting tool are selectively used depending on the materials of workpieces, required processing accuracy, and the like. For example, a cBN sintered material (hereinafter, also referred to as a "High-cBN sintered material") having a high content ratio of cubic boron nitride (hereinafter, also referred to as "cBN") can be suitably used for cutting a sintered alloy or the like.

However, in the High-cBN sintered material, there is a tendency that a sudden breakage easily occurs. It is considered that this is because the bonding force between the cBN grains is weak, which causes the cBN grains to fall. For example, WO 2005/066381 (PTL1) discloses a technique for suppressing the occurrence of sudden breakage in the High-cBN sintered material by appropriately selecting a binder.

CITATION LIST

Patent Literature

PTL 1: WO 2005/066381

SUMMARY OF INVENTION

A cubic boron nitride sintered material according to an aspect of the present disclosure includes 70 vol % or more and less than 100 vol % of cubic boron nitride and a binder. The binder includes a first material and a second material. The first material is one or two or more first chemical species each including at least one first metallic element selected from the group consisting of tungsten, cobalt, and aluminum. Each of the first chemical species is a metal, an alloy, an intermetallic compound, a compound, or a solid solution. The second material is one or two or more second chemical species each including at least one second metallic element selected from the group consisting of titanium, zirconium, hafnium, vanadium, niobium, tantalum, and chromium. Each of the second chemical species is a solid solution derived from at least one selected from the group consisting of nitride, carbide, and carbonitride. In each of the second chemical species, 0.1 atom % to 10 atom % of aluminum is dissolved in a solid state, and the second material is grains having an average grain size of 1 μm or less.

A cutting tool according to an aspect of the present disclosure includes the cubic boron nitride sintered material.

DETAILED DESCRIPTION

Problems to be Solved by Present Disclosure

In recent years, with the rapid increase in functionality of machine parts, the difficulty in cutting of a workpiece to be cut into the machine parts has been accelerated. Along with this, a problem of an increase in cost due to shortening of the life of a cutting tool has become obvious. Therefore, further improvement of a High-cBN sintered material is desired. In view of the above, it is an object of the present disclosure to provide a cubic boron nitride sintered material that enables a longer tool life and a cutting tool including the same.

Advantageous Effect of Present Disclosure

According to the present disclosure, it is possible to provide a cubic boron nitride sintered material that enables a longer tool life, and a cutting tool including the same.

DESCRIPTION OF EMBODIMENTS

The present inventors have found that occurrence of repeated heat generation and rapid cooling at a cutting edge during cutting is one of the causes that sudden breakage is likely to occur in the High-cBN sintered material. Specifically, the inside of the cutting edge cannot follow the expansion and contraction of surface of the cutting edge due to the repeated heat generation and rapid cooling, and heat cracks occur in the surface of the cutting edge, resulting in sudden breakage. Based on the above findings, the present inventors have conceived that a metal compound powder (such as a second material described below) having a thermal expansion coefficient close to that of cBN is added and dispersed into a cBN sintered material together with another binder. Furthermore, the present inventors have also conceived to make the grain size of the metal compound powder fine so that the the metal compound powder does not serve as an origin of heat crack during cutting. This suppresses the occurrence of heat cracks in the surface of the cutting edge during cutting, thereby realizing a significant improvement in stability against breakage, and the present disclosure has been achieved. Hereinafter, embodiments according to the present disclosure will be listed and described below.

(1) A cubic boron nitride sintered material according to an aspect of the present disclosure includes 70 vol % or more and less than 100 vol % of cubic boron nitride and a binder. The binder includes a first material and a second material. The first material is one or two or more first chemical species each including at least one first metallic element selected from the group consisting of tungsten, cobalt, and aluminum. Each of the first chemical species is a metal, an alloy, an intermetallic compound, a compound, or a solid solution. The second material is one or two or more second chemical species each including at least one second metallic element selected from the group consisting of titanium, zirconium, hafnium, vanadium, niobium, tantalum, and chromium. Each of the second chemical species is a solid solution derived from at least one selected from the group consisting of nitride, carbide, and carbonitride. In each of the second chemical species, 0.1 atom % to 10 atom % of aluminum is dissolved in a solid state, and the second material is grains having an average grain size of 1 μm or less. When the cubic boron nitride sintered material having such characteristics is applied to a cutting tool, it is possible to realize a longer tool life of the cutting tool.

(2) In each of the second chemical species, it is preferable that 0.1 atom % to 7 atom % of aluminum is dissolved in the solid state. This can more sufficiently realize a longer tool life of the cutting tool.

(3) In each of the second chemical species, it is preferable that 0.1 atom % to 5 atom % of aluminum is dissolved in the solid state. This can more sufficiently realize a longer tool life of the cutting tool.

(4) An X-ray diffraction method is used to measure an X-ray diffraction intensity of the cubic boron nitride sintered material to provide results. In a graph of the results in which an horizontal axis represents 2θ and an vertical axis represents a relative intensity, in the cubic boron nitride sintered material, it is preferable that a peak $I_{BN}$ of the relative intensity in a (111) plane of the cubic boron nitride and a peak $I_a$ of the relative intensity in a (111) plane of the second material satisfy the following relational expression: $0.001 \leq I_a/I_{BN} \leq 0.3$. This allows the cutting tool to have both improved cutting edge strength and superior wear resistance.

(5) An X-ray diffraction method is used to measure an X-ray diffraction intensity of the cubic boron nitride sintered material to provide results. In a graph of the results in which an horizontal axis represents 2θ and an vertical axis represents a relative intensity, in the cubic boron nitride sintered material, it is preferable that a peak $I_{BN}$ of the relative intensity in a (111) plane of the cubic boron nitride and a peak $I_a$ of the relative intensity in a (111) plane of the second material satisfy the following relational expression: $0.01 \leq I_a/I_{BN} \leq 0.2$. This allows the cutting tool to have both improved cutting edge strength and superior wear resistance more sufficiently.

(6) In each of the first chemical species, it is preferable that more than 10 atom % and 50 atom % or less of at least one third metallic element selected from the group consisting of titanium, zirconium, hafnium, vanadium, niobium, tantalum, chromium, and molybdenum is dissolved in the solid state. This allows the cutting tool to have an improved breakage resistance.

(7) In each of the first chemical species, it is preferable that 20 atom % to 45 atom % of at least one third metallic element selected from the group consisting of titanium, zirconium, hafnium, vanadium, niobium, tantalum, chromium, and molybdenum is dissolved in the solid state. This allows the cutting tool to have an improved breakage resistance.

(8) Each of the first chemical species may be a solid solution. In each of the first chemical species, it is preferable that 0.1 atom % to 10 atom % of at least one fourth metallic element selected from the group consisting of titanium, zirconium, hafnium, vanadium, niobium, tantalum, chromium, molybdenum, and tungsten is dissolved in the solid state. This allows the cutting tool to have an improved breakage resistance.

(9) In each of the second chemical species, it is preferable that 0.1 atom % to 5 atom % of at least one fourth metallic element selected from the group consisting of titanium, zirconium, hafnium, vanadium, niobium, tantalum, chromium, molybdenum, and tungsten is dissolved in the solid state. This allows the cutting tool to have an improved breakage resistance.

(10) Each of the first chemical species may be a solid solution. In each of the first chemical species, it is preferable that 0.2 atom % to 5 atom % of at least one fourth metallic element selected from the group consisting of titanium, zirconium, hafnium, vanadium, niobium, tantalum, chromium, molybdenum, and tungsten is dissolved in the solid state, and in each of the second chemical species, 0.2 atom % to 3 atom % of the fourth metallic element is dissolved in the solid state. This allows the cutting tool to have an improved breakage resistance more sufficiently.

(11) It is preferable that the cubic boron nitride sintered material contains 1.5 mass % or less of oxygen. This allows the cutting tool to have an improved breakage resistance.

(12) It is preferable that the cubic boron nitride sintered material contains 0.7 mass % or less of oxygen. This allows the cutting tool to have an improved breakage resistance more sufficiently.

(13) It is preferable that the cubic boron nitride sintered material contains 80 vol % to 95 vol % of the cubic boron nitride. This enables a longer tool life of a cutting tool including a cubic boron nitride sintered material having an extremely high content of cBN.

(14) A cutting tool according to an aspect of the present disclosure includes the cubic boron nitride sintered material. The cutting tool having such characteristics can have a longer tool life.

Details of Embodiments of the Invention

Hereinafter, an embodiment according to the present invention (hereinafter, also referred as to "the present embodiment") will be described. However, the present embodiment is not limited thereto. In the present specification, the notation in the form of "A to B" means a lower limit and an upper limit of a range (that is, A or more and B or less), and when there is no description of a unit for A and a unit is described only for B, the unit of A and the unit of B are the same. Furthermore, in the present specification, when a compound or the like is represented by a chemical formula, any conventionally known atomic ratio is included unless the atomic ratio is particularly limited, and the compound or the like should not necessarily be limited only to a stoichiometric range.

[Cubic Boron Nitride Sintered Material (cBN Sintered Material)]

A cubic boron nitride sintered material (cBN sintered material) according to the present embodiment is a cBN sintered material including 70 vol % or more and less than 100 vol % of cubic boron nitride (cBN) and a binder. The binder includes a first material and a second material. The first material is one or two or more first chemical species each including at least one first metallic element selected from the group consisting of tungsten, cobalt, and aluminum. Each of the first chemical species is a metal, an alloy, an intermetallic compound, a compound, or a solid solution. The second material is one or two or more second chemical species each including at least one second metallic element selected from the group consisting of titanium, zirconium, hafnium, vanadium, niobium, tantalum, and chromium. Each of the second chemical species is a solid solution derived from at least one selected from the group consisting of nitride, carbide, and carbonitride. In other words, the second chemical species is a solid solution in which another element is dissolved in the solid state in at least one selected from the group consisting of nitride, carbide, and carbonitride. Furthermore, in each of the second chemical species, 0.1 atom % to 10 atom % of aluminum is dissolved in the solid state. The second material is grains having an average grain size of 1 μm or less. When the cBN sintered material having such characteristics is applied to a cutting tool, it is possible to realize a longer tool life of the cutting tool.

It is preferable that the cBN sintered material contains 1.5 mass % or less of oxygen. This allows the content of a brittle phase (for example, a $Al_2O_3$ phase or the like) containing oxygen in the cBN sintered material to be sufficiently reduced as compared with a conventional cBN sintered material, thereby improving a breakage resistance of a cutting tool to which the cBN sintered material is applied.

It is more preferable that the cBN sintered material more preferably contains 0.7 mass % or less of oxygen. The lower limit value of the oxygen content in the cBN sintered material is 0 mass % as an ideal value.

An oxygen content (mass %) in a cBN sintered material can be confirmed by performing structural observation, elemental analysis, and the like on the cBN sintered material using an energy dispersive X-ray analyzer (EDX) attached to a scanning electron microscope (SEM).

Specifically, first, a cBN sintered material is cut at an arbitrary position to prepare a sample including a cross section of the cBN sintered material. The cross section can be formed by using a focused ion beam apparatus, a cross section polisher apparatus, or the like. Next, a reflection electron image is obtained by observing the cross section with an SEM at a magnification of 500 times. The oxygen content (mass %) can be quantified by performing elemental analysis on the reflection electron image using the EDX. Here, with respect to the oxygen content (mass %) in the cBN sintered material, an average value is calculated from the values of the oxygen contents (mass %) obtained by the above-described elemental analysis on the reflection electron images in three fields of view using the EDX, and the average value can be set as the oxygen content (mass %) in the cBN sintered material. The oxygen content (mass %) in the cBN sintered material can also be measured using an oxygen analyzer (trade name: "EMG 950", manufactured by Horiba, Ltd.). With this apparatus, a numerical value of the same oxygen content as that in the elemental analysis using the EDX attached to the SEM can be obtained, but there is an advantage of a higher accuracy.

<Cubic Boron Nitride (cBN)>

The cBN sintered material according to the present embodiment includes 70 vol % or more and less than 100 vol % of cBN as described above. The cBN sintered material preferably includes 80 vol % to 95 vol % of cBN, and more preferably includes 85 vol % to 95 vol % of cBN. That is, the cBN sintered material is a so-called High-cBN sintered material. Here, the cBN is preferably cubic boron nitride grains (hereinafter also referred to as "cBN grains") having an average grain size ($D_{50}$) of 0.1 to 10 μm. The cBN grains have high hardness, strength and toughness, and serve as a base in the cBN sintered material. The content (vol %) of cBN in a cBN sintered material is substantially the same as the content (vol %) of a cBN powder used in a mixed powder described below. Therefore, the content of cBN in the cBN sintered material can be adjusted to a desired range by controlling the content of the cBN powder used in the mixed powder.

The content (vol %) of cBN in the cBN sintered material can be confirmed by performing, on the cBN sintered material, quantitative analysis by inductively coupled plasma spectrometry (ICP), structural observation and elemental analysis using an energy dispersive X-ray analyzer (EDX) attached to a scanning electron microscope (SEM) or an EDX attached to a transmission electron microscope (TEM), or the like.

For example, when the SEM is used, the content (vol %) of cBN can be obtained as follows. First, a cBN sintered material is cut at an arbitrary position to prepare a sample including a cross section of the cBN sintered material. A focused ion beam apparatus, a cross-section polisher apparatus, or the like can be used to form the cross section. Next, a reflection electron image is obtained by observing the cross section with an SEM at a magnification of 2,000 times. In the reflection electron image, a region where cBN exists appears as a black region, and a region where a binder exists appears as a gray region or a white region.

Next, binarization processing is performed on the reflection electron image by using image analysis software (for example, "WinROOF" of Mitani Corporation), and each area ratio is calculated from the image after the binarization processing. Next, the area ratio may be considered as continuous also in a depth direction of the cross section, so that the area ratio can be obtained as a content (vol %) of cBN in the cBN sintered material. By this measurement method, the content (vol %) of the binder to be described later can be obtained at the same time.

The area-based $D_{50}$ (average grain size) of cBN grains is not particularly limited, and may be, for example, 0.1 to 10 μm. In general, the smaller the $D_{50}$, the higher the hardness of the cBN sintered material tends to be, and the smaller the variation in grain size, the more uniform the properties of the cBN sintered material tend to be. The cBN grains preferably have a $D_{50}$ of 0.5 to 4 μm.

The $D_{50}$ of cBN grains is determined as follows. First, a sample including a cross section of the cBN sintered material is prepared to obtain a reflection electron image in accordance with the above-described method of measuring the content of cBN grains. Next, a circle equivalent diameter of each black region in the reflection electron image is calculated using the image analysis software described above. In this case, it is preferable to observe 5 or more fields of view to calculate the circle equivalent diameters of 100 or more cBN grains.

Next, the circle equivalent diameters are arranged in ascending order from a minimum value to a maximum value to obtain a cumulative distribution. In the cumulative distribution, the grain size at which a cumulative area is 50% is the $D_{50}$. Note that the circle equivalent diameter means a diameter of a circle having the same area as the measured area of each of cBN grains.

<Binder>

The cBN sintered material according to the present embodiment includes a binder as described above. The binder includes a first material and a second material. In addition, the cBN sintered material may contain inevitable impurities resulting from raw materials used, manufacturing conditions, and other factors. The binder preferably has a content (vol %) of more than 0 vol % and 30 vol % or less, and more preferably 5 to 20 vol %. The binder serves to enable cBN, which is a hard-to-sinter material, to be sintered at an industrial level of pressure and temperature. Furthermore, since the binder has a lower reactivity with iron than cBN, the binder also plays a role in suppressing chemical and thermal wear in cutting a high-hardness hardened steel. The cBN sintered material containing a binder can have an improve wear resistance during high-efficiency machining of a high-hardness hardened steel.

Examples of the inevitable impurities that may be contained in the cBN sintered material include lithium (Li), carbon (C), oxygen (O), sulfur (S), and the like. The cBN sintered material may contain 0.5 mass % or less of one impurity of the inevitable impurities solely, or may contain 1 mass % or less of all inevitable impurities in total. In the present specification, the "inevitable impurities" that may be contained in the cBN sintered material are handled as a third component other than the cBN and the binder.

(First Material)

The first material is one or two or more first chemical species each including at least one first metallic element selected from the group consisting of tungsten (W), cobalt (Co), and aluminum (Al). Each of the first chemical species is a metal, an alloy, an intermetallic compound, a compound, or a solid solution. Specifically, each of the first material is tungsten carbide (WC), a metal containing Co, an alloy containing Co, an intermetallic compound containing Co, a metal containing Al, an Al compound, and a solid solution derived from at least one selected from the group consisting of these metals, alloys, intermetallic compounds, and compounds. More specifically, examples of the first material include tungsten carbide (WC), metal Co, a WC—Co solid solution, a W—Co solid solution, metal Al, CoAl, $Al_2O_3$, AlN, and $AlB_2$ each as the Al compound, and a composite compound thereof as well as $W_2Co_{21}B_6$, $W_3Co_3C$, and the like. In the present specification, "CoAl" is handled as an Al compound.

When each first chemical species constituting the first material is a metal, an alloy, an intermetallic compound, a compound, or a solid solution, at least one third metallic element selected from the group consisting of titanium (Ti), zirconium (Zr), hafnium (Hf), vanadium (V), niobium (Nb), tantalum (Ta), chromium (Cr), and molybdenum (Mo) may be dissolved in the solid state. When the first chemical species constituting the first material is a metal, an alloy, an intermetallic compound, a compound or a solid solution, more than 10 atom % and 50 atom % or less of the third metallic element is preferably dissolved in the solid state. That is, it is preferable that the first chemical species constituting the first material is a metal, an alloy, an intermetallic compound, a compound, or a solid solution, and that in the first chemical species, more than 10 atom % and 50 atom % or less of at least one third metallic element selected from the group consisting of Ti, Zr, Hf, V, Nb, Ta, Cr, and Mo is dissolved in the solid state. In the first chemical species, 20 atom % to 45 atom % of the third metallic element is more preferably dissolved in the solid state. Here, in the present specification, the content (solid solution amount, for example, more than 10 atom % and 50 atom % or less) of the third metallic element dissolved in the first chemical species represents a content when the total content of the first chemical species is set to 100 atom %. Similarly, the content (solid solution amount) of the fourth metallic element to be described later represents a content when the total content of the first chemical species is set to 100 atom %.

In the first material, the third metallic element is dissolved in the solid state in the first chemical species constituting the first material in the amount within the range described above. This enables higher strength, thereby improving breakage resistance. In this case, it is extremely suitable for machining a high-strength sintered alloy by intermittent cutting. It is known that the intermittent cutting of the high strength sintered alloy results in causing significant mechanical abrasion of the binder as compared to continuous machining. As the mechanical abrasion progresses, a bonding force between cBN grains also decreases, so that heat cracks may occur in a cutting tool during machining, resulting in breakage of a cutting edge. According to the cBN sintered material of the present embodiment, as described above, the third metallic element is dissolved in the solid state in the first material in the amount within the range described above to toughen the cBN sintered material, thereby reducing mechanical abrasion and enabling long-distance cutting of the high-strength sintered alloy.

When the solid solution amount of the third metallic element in the first material is 10 atom % or less, the same effect as that obtained when the fourth metallic element described below is dissolved in the solid state in the first material can be obtained. When the solid solution amount of the third metallic element in the first material exceeds 50 atom %, wear resistance against a workpiece tends to decrease. Since the third metallic element is a component for obtaining a preferable effect of the present disclosure, the solid solution amount of the third metallic element dissolved in the solid state in the first chemical species constituting the first material may be 0 atom %.

When the first chemical species constituting the first material is a solid solution, at least one fourth metallic element selected from the group consisting of titanium (Ti), zirconium (Zr), hafnium (Hf), vanadium (V), niobium (Nb), tantalum (Ta), chromium (Cr), molybdenum (Mo), and tungsten (W) may be dissolved in the solid state in the first material. When the first chemical species constituting the first material is a solid solution, 0.1 atom % to 10 atom % of the fourth metallic element is preferably dissolved in the solid state. That is, it is preferable that the first chemical species constituting the first material is a solid solution, and that in the first chemical species, 0.1 atom % to 10 atom % of at least one fourth metallic element selected from the group consisting of Ti, Zr, Hf, V, Nb, Ta, Cr, Mo, and W is dissolved in the solid state. In the first chemical species, 0.2 atom % to 5 atom % of the fourth metallic element is more preferably dissolved in the solid state. The fourth metallic element is dissolved in the solid state in the first chemical species constituting the first material in an amount within the range described above. This enables higher strength, thereby improving breakage resistance.

When the solid solution amount of the fourth metallic element in the first material is less than 0.1 atom %, the effect described above tends to be insufficient. When the solid solution amount of the fourth metallic element in the first material exceeds 10 atom %, the same effect as that obtained when the third metallic element is dissolved in the solid state in the first material can be obtained, except when the fourth metallic element is W. Since the fourth metallic element is a component for obtaining a preferable effect of the present disclosure, the solid solution amount of the fourth metallic element dissolved in the solid state in the first chemical species constituting the first material may be 0 atom %.

The first material is considered to be particularly effective for extending a tool life of the cBN sintered material based on the function of W, Co, Al, and the like which are the first metallic elements constituting the first material. First, since Co and Al have a catalytic function, they can promote bonding between cBN grains in a sintering step described below. Second, W is believed to be effective in bringing a thermal expansion coefficient of the binder closer to that of the cBN grains. The catalytic function means a function of promoting, through Co or Al, diffusion or precipitation of B (boron) and N (nitrogen) constituting the cBN grains.

(Second Material)

The second material is one or two or more second chemical species each including at least one second metallic element selected from the group consisting of titanium (Ti), zirconium (Zr), hafnium (Hf), vanadium (V), niobium (Nb), tantalum (Ta), and chromium (Cr). Each of the second chemical species is a solid solution derived from at least one selected from the group consisting of nitride, carbide, and carbonitride. In each of the second chemical species, 0.1 atom % to 10 atom % of aluminum (Al) is dissolved in the solid state. It is preferable that 0.1 atom % to 7 atom % of Al is dissolved in the solid state in the second chemical species. It is more preferable that 0.1 atom % to 5 atom % of Al is dissolved in the solid state in the second chemical species. Here, in the present specification, the content (solid solution amount, for example, 0.1 atom % to 10 atom %) of Al dissolved in the solid state in the second chemical species represents a content when the total content of the second chemical species is set to 100 atom %. Similarly, the content (solid solution amount) of the fourth metallic element to be described later represents a content when the total content of the second chemical species is set to 100 atom %.

In the second material, Al is dissolved in the solid state in the second chemical species constituting the second material in the amount within the range described above. This enables higher hardness, thereby improving wear resistance. In the second material, when the solid solution amount of Al is less than 0.1 atom %, the effect described above tends to be insufficiently obtained. On the other hand, it is difficult to dissolve more than 10 atom % of Al in the solid state in the second material because this tends to promote decomposition of the second material into AlN or $Al_2O_3$.

The second material is grains having an average grain size of 1 μm or less. This can suppress the progress of mechanical wear of the sintered material during cutting. The second material is preferably grains having an average grain size of 0.5 μm or less, and more preferably grains having an average grain size of 0.3 μm or less. The lower limit value of the average grain size of the grains of the second material is not particularly limited, but may be, for example, 0.05 μm.

The second material preferably has a sodium chloride-type crystal structure. This allows the second material to have high hardness, thereby improving wear resistance. The fact that the second material has the sodium chloride-type crystal structure is confirmed in the following manner: an X-ray diffraction intensity of the cBN sintered material is measured by an X-ray diffraction method and a sodium chloride-type Bragg peak is obtained in a range of 20° to 90° in a resulting graph in which an horizontal axis represents 2θ and an vertical axis represents a relative intensity.

In a method of measuring the average grain size of the second material, first, a sample is taken from a cBN sintered material, and a sliced piece having a thickness of 30 to 100 nm is prepared from the sample using an argon ion slicer. Next, the sliced piece is observed with a STEM (Scanning Transmission Electron Microscope, trade name: "JSM-7800F", manufactured by JEOL Ltd.) at a magnification of 20,000 times, and further subjected to element mapping using an EDX to identify a region where the first metallic element exists. Next, the region in which the first metallic element exists is observed with an observation magnification changed to 100,000 times to capture a grain of the second material. Furthermore, among line segments connecting arbitrary two points on the contour line of the grain of the second material, a distance of the maximum line segment (hereinafter, also referred to as "maximum distance between two points") is measured. By repeating the above operation in 10 fields of view, the 10 maximum distances between two points are obtained. An average value is calculated from the 10 values of the maximum distances, and the average value can be set as the average grain size of the second grains.

Furthermore, it is preferable that 0.1 atom % to 5 atom % of at least one fourth metallic element selected from the group consisting of Ti, Zr, Hf, V, Nb, Ta, Cr, Mo, and W is dissolved in the solid state in each of the second chemical species constituting the second material. It is more preferable that 0.2 atom % to 3 atom % of the fourth metallic element is dissolved in the solid state in each of the second chemical species constituting the second material. That is, the second material preferably contains a predetermined amount of the fourth metallic element dissolved in the solid state in addition to Al. This allows the second material to have higher strength, thereby improving breakage resistance.

When the solid solution amount of the fourth metallic element in the second material is less than 0.1 atom %, the second material tends to insufficiently obtain the effect described above. When the solid solution amount of the fourth metallic element in the second material exceeds 10 atom %, wear resistance against a workpiece tends to decrease. Since the fourth metallic element is a component for obtaining a preferable effect of the present disclosure, the solid solution amount of the fourth metallic element dissolved in the solid state in the second chemical species constituting the second material may be 0 atom %. Furthermore, the fourth metallic element dissolved in the solid state in the first material and the fourth metallic element dissolved in the solid state in the second material may be the same metallic element selected from the group described above, or may be different metallic elements.

<Method of Measuring Composition of Binder>

The composition of the binder can be determined by a combination of XRD (X-ray diffraction measurement) and ICP. Specifically, first, a test piece having a thickness of about 0.45 to 0.5 mm is cut out from the cBN sintered material, and an XRD analysis is performed on the test piece to qualitatively identify compounds, metals, and the like based on X-ray diffraction peaks. Next, the test piece is immersed in fluoronitric acid (mixed acid of concentrated nitric acid (60%), distilled water, and concentrated hydrofluoric acid (47%) mixed at a volume ratio of 2:2:1) in a closed container to obtain an acid treatment solution in which the binder is dissolved in the solid state. Furthermore, the acid-treated solution is subjected to an ICP analysis to quantitatively analyze each metallic element. Finally, the composition of the binder can be determined by analyzing the results of the XRD and the ICP analysis. The detailed composition of the binder (compositions of the first material and the second material) can be identified by the following method.

<Method of Identifying and Distinguishing Compositions of First Material and Second Material Using TEM-EDX>

As described above, the binder includes the first material and the second material. The first material may be first chemical species that are/is both or one of a metal containing Al serving as the first metallic element and an Al compound, and the first chemical species may be a metal, an alloy, an intermetallic compound, a compound or a solid solution in which at least one third metallic element selected from the group consisting of Ti, Zr, Hf, V, Nb, Ta, Cr and Mo is dissolved in the solid state in an amount within the range described above, or a solid solution in which at least one fourth metallic element selected from the group consisting of Ti, Zr, Hf, V, Nb, Ta, Cr, Mo and W is dissolved in the solid state in an amount within the range described above. On the other hand, the second material is one or two or more second chemical species each including at least one second metallic element selected from the group consisting of Ti, Zr, Hf, V, Nb, Ta, and Cr. Each of the second chemical species is a solid solution derived from at least one selected from the group consisting of nitride, carbide, and carbonitride, in which Al is dissolved in the solid state in an amount within the range described above. Furthermore, in each of the second chemical species, the fourth metallic element may be dissolved in the solid state in addition to the Al.

As described above, the first chemical species constituting the first material and the second chemical species constituting the second material may be different from each other only in terms of whether or not nitrogen (N) and carbon (C) are contained when compared from a viewpoint of constituent elements. In this case, the compositions of the first chemical species and the second chemical species can be identified and distinguished from each other by analyzing the cBN sintered material using an energy dispersive X-ray analyzer attached to a transmission electron microscope (TEM-EDX). Specifically, for example, the compositions of the first chemical species and the second chemical species can be identified and distinguished from each other by performing elemental analysis using the TEM-EDX on a region (hereinafter also referred to as a "first region") in which a structure of "cBN grain/binder layer/cBN grain" is formed by adjacent cBN grains in the cBN sintered material.

In the analysis using the TEM-EDX, first, a sample is taken from a cBN sintered material, and a sliced piece having a thickness of 30 to 100 nm is prepared from the sample using an argon ion slicer. Next, the sliced piece is observed with a TEM (transmission electron microscope) at a magnification of 50,000 times to obtain a first image. Further, one of the first regions is arbitrarily selected in the first image. Next, an area (hereinafter also referred as to a "interface area") including an interface between the cBN grain and the binder in the selected first area is positioned so that the area passes through a vicinity of the center of the image, and is observed with an observation magnification changed to two million times to obtain a second image (100 nm×100 nm). In the second image, the interface area exists so as to extend from one end of the image to the other end (an end opposite to the one end) through the vicinity of the center of the image.

Next, an element mapping analysis using the EDX is performed on the second image to analyze the distribution of various elements (transition metallic elements, other metallic elements, and non-metallic elements) in the first region. In this case, an area having high atomic concentrations of B (boron) and N (nitrogen) and other areas are observed so as to coincide with the shape of the interface area. Since the area having high atomic concentrations of B and N is an area of cBN grain, the elemental mapping analysis in the other areas, which are areas of binder, is further performed.

As a result, an area where distributions (the presence and concentration of each element) of the second metallic element, Al, and at least one of N (nitrogen) or C (carbon) are confirmed can be identified as an area where the second chemical species exist, and thus the composition of the second chemical species can be identified. In an area where the second chemical species exist, the distribution of the fourth metallic element may be confirmed. On the other hand, an area where the first chemical species exist can be identified as an area where distributions of N and C are not confirmed, and thus the composition of the first chemical species can be identified. Furthermore, in the area where the first chemical species exist, distributions of the third metallic element or the fourth metallic element and non-metallic elements such as oxygen and boron may be confirmed together with at least one metallic element of W, Co, or Al. In this manner, the first chemical species and the second chemical species can be identified in terms of composition and distinguished from each other. The atomic concentration of the third metallic element dissolved in the solid state in the first chemical species, the atomic concentrations of the fourth metallic element dissolved in the solid state in the first chemical species and the second chemical species, and the atomic concentration of Al dissolved in the solid state in the second chemical species can be determined by the element mapping analysis using the EDX. The analysis is performed on the second images of 5 fields of view to obtain atomic concentrations of the third metallic element, the fourth metallic element, and the Al, and then average values are calculated from the obtained atomic concentrations for the respective elements. These average values can be set as the atomic concentrations of the third metallic element, the fourth metallic element, and the Al.

<$I_a/I_{BN}$>

The cBN sintered material according to the present embodiment preferably has the following characteristics based on analysis using an X-ray diffraction method. That is, the X-ray diffraction method is used to measure an X-ray diffraction intensity of the cBN sintered material to provide results. In a graph of the results in which an horizontal axis represents 2θ and an vertical axis represents a relative intensity, in the cBN sintered material, it is preferable that a peak $I_{BN}$ of the relative intensity in a (111) plane of the cBN and a peak h of the relative intensity in a (111) plane of the second material satisfy the following relational expression: $0.001 \leq I_a/I_{BN} \leq 0.3$. In the cBN sintered material, it is more preferable that peak $I_{BN}$ of the relative intensity in the (111) plane of the cBN and peak 1, of the relative intensity in the (111) plane of the second material satisfy the following relational expression: $0.01 \leq I_a/I_{BN} \leq 0.2$.

The X-ray diffraction intensity of the cBN sintered material may be measured using a typical X-ray diffraction apparatus, and thus the apparatus and measurement conditions should not be particularly limited. For example, the X-ray diffraction intensity of the sintered material can be measured using an X-ray diffractometer (trade name (model number): "MiniFlex600", manufactured by Rigaku Corporation, analysis software: "PDXL2"). The measurement conditions may be as follows, for example.

(Measurement Conditions of X-Ray Diffraction Intensity)
Characteristic X-ray: Cu-Kα
Tube voltage: 40 kV
Tube current: 15 mA
Filter: multilayer mirror
Optical system: focusing method
X-ray diffraction method: θ-2θ method
Scan speed of X-ray diffraction apparatus: 5°/min, step: 0.02°, scan range: 10 to 120°.

Here, from the analysis described above, satisfying the relational expression of $0.001 \leq I_a/I_{BN} \leq 0.3$ in the cBN sintering material means that the relative content ratio of the second material to cBN in the cBN sintered material is 0.001 to 0.3. Accordingly, the cBN sintered material can contain a sufficient amount of the second material with respect to cBN, and thus, when the cBN sintered material is applied to a cutting tool, it is possible to achieve both an improved cutting edge strength and a superior wear resistance of the cutting tool. On the other hand, the reason why the relative content ratio between cBN and the second material in the cBN sintered material is expressed as a ratio of the X-ray diffraction intensities is as follows. That is, the above-described analysis method using the SEM or the STEM is a method of analyzing a local area in the sintered material, and is superior in composition analysis and grain size analysis for one grain. However, the method using the X-ray diffraction method is suitable for more accurate analysis of, for example, an existence ratio of cBN to the second material in the sintered material over the entire sintered material.

When $I_d/I_{BN}$ is less than 0.001, the amount of the second material with respect to cBN is very small, and thus the improvement of the cutting edge strength tends to be insufficiently obtained. When $I_d/I_{BN}$ exceeds 0.3, the amount of the second material with respect to cBN is excessive, and thus wear resistance and breakage resistance tend to be obtained insufficiently. That is, the relational expression described above can be used as an index of whether or not, in the cBN sintered material of the present embodiment, the content of the second material in the sintered material is controlled to be an appropriate amount with respect to the content of cBN. In the cBN sintered material, a relational expression of $0.01 \leq I_d/I_{BN} \leq 0.2$ is more preferably satisfied, and a relational expression of $0.05 \leq I_d/I_{BN} \leq 0.1$ is even more preferably satisfied.

<Function>

The cBN sintered material according to the present embodiment includes a first material and a second material as the binder as described above. The first material is one or two or more first chemical species each including at least one first metallic element selected from the group consisting of W, Co, and Al. Each of the first chemical species is a metal, an alloy, an intermetallic compound, a compound, or a solid solution. The second material is one or two or more second chemical species each including at least one second metallic element selected from the group consisting of Ti, Zr, Hf, V, Nb, Ta, and Cr. Each of the second chemical species is a solid solution derived from at least one selected from the group consisting of nitride, carbide, and carbonitride. In each of the second chemical species, 0.1 atom % to 10 atom % of aluminum is dissolved in the solid state. Furthermore, the second material is grains having an average grain size of 1 μm or less. In this case, it is expected that when the cBN sintered material is applied to a cutting tool, the cutting tool can have a longer tool life for the following reasons.

First, the second material is one or two or more second chemical species each including at least one second metallic element selected from the group consisting of Ti, Zr, Hf, V, Nb, Ta, and Cr. Each of the second chemical species is a solid solution derived from at least one selected from the group consisting of nitride, carbide, and carbonitride. Therefore, the second chemical species can be dispersed, as a metal compound powder having a thermal expansion coefficient close to that of cBN, into the cBN sintered material together with the other material(s) of the binder. This allows a gap of thermal expansion coefficients in the sintered material to be reduced, so that origins of heat cracks are less likely to be formed during cutting, and the breakage resistance is improved. Furthermore, since the second chemical species contains Al, a catalytic function based on Al can also be obtained. The second material is grains having an average grain size of 1 μm or less. This can suppress the progress of mechanical wear during cutting. As described above, when the cBN sintered material according to the present embodiment is applied to a cutting tool, it is considered that the occurrence of heat cracks on the surface of the cutting edge during cutting can be significantly suppressed. This enables a significant improvement in stability against breakage.

In addition, the third metallic element or the fourth metallic element is dissolved in the solid state in the first chemical species constituting the first material in the amount within the range described above. The fourth metallic element is dissolved in the solid state in the second chemical species constituting the second material in the amount within the range described above. These can improve the breakage resistance of the cutting tool. When the relational expression of $0.001 \leq I_d/I_{BN} \leq 0.3$ is satisfied in the cBN sintered material, it is possible to achieve both an improved cutting edge strength and a superior wear resistance. As a result, it is expected that when the cBN sintered material according to the present embodiment is applied to a cutting tool, the cutting tool can have a longer tool life.

[Cutting Tool]

A cutting tool according to the present embodiment includes the cBN sintered material. Specifically, the cutting tool preferably includes the cBN sintered material as a base material. A part or all of the surface of the cBN sintered material serving as the base material may be coated with a coating.

The shape and application of the cutting tool according to the present embodiment is not particularly limited. Examples of the shape and application of the cutting tool include a drill, an end mill, an indexable cutting insert for a drill, an indexable cutting insert for an end mill, an indexable cutting insert for milling, an indexable cutting chip for turning, a metal saw, a gear cutting tool, a reamer, a tap, and an insert for pin milling of a crankshaft.

Furthermore, the cutting tool according to the present embodiment includes not only a cutting tool in which the entire tool is formed of the cBN sintered material, but also a cutting tool in which only a part of the tool (particularly, a cutting edge portion (cutting edge portion) or the like) is formed of the cBN sintered material. For example, the cutting tool according to the present embodiment also includes a cutting tool in which only a cutting edge portion of a base body (support body) made of cemented carbide or the like is constituted of a cBN sintered material. In this case, the cutting edge portion can be literally regarded as a cutting tool. In other words, the cBN sintered material is referred to as a cutting tool even though the cBN sintered material occupies only a part of the cutting tool.

The cutting tool according to the present embodiment may include a coating that covers at least the cutting edge portion. In this case, the coating may be formed on the cutting edge portion of the cBN sintered material by a conventionally known method. Examples of the method of forming the coating include physical vapor deposition methods such as an ion plating method, an arc ion plating method, a sputtering method, and an ion mixing method. The coating may be also formed by a chemical vapor deposition method. The composition of the coating is not particularly limited, and any conventionally known coating may be employed. Examples of the composition of the coating include AlTiSiN, AlCrN, TiZrSiN, CrTaN, HfWSiN, CrAlN, TiN, TiBNO, TiCN, TiCNO, $TiB_2$, TiAlN, TiAlCN, TiAlON, TiAlONC, and $Al_2O_3$.

Since the cutting tool according to the present embodiment includes the cBN sintered material, the occurrence of heat cracks during cutting can be significantly suppressed, and thus the cutting tool can have a longer tool life.

[Method of Producing Cubic Boron Nitride Sintered Material]

A method of producing a cBN sintered material according to the present embodiment is not particularly limited as long as the cBN sintered material as described above that enable a longer tool life when applied to a cutting tool is obtained. However, from a viewpoint of yield and the like, it is preferable to obtain the cBN sintered material by, for example, the following production method. The present inventors have found that a cBN sintered material enabling a longer tool life can be produced by preparing a metal compound powder (second material raw powder) having a thermal expansion coefficient close to that of cBN and mixing the metal compound powder with a first material raw powder and a cBN powder in a process of producing the cBN sintered material.

Specifically, the method of producing a cBN sintered material according to the present embodiment preferably includes a step (first step) of preparing a first material raw powder, a second material raw powder and a cBN powder, a step (second step) of mixing the first material raw powder, the second material raw powder and the cBN powder to prepare a mixed powder including 70 vol % or more and less than 100 vol % of the cBN powder and more than 0 vol % and 30 vol % or less of the binder (first material and second material), and a step (third step) of sintering the mixed powder to obtain a cBN sintered material. Hereinafter, each of the steps will be described in detail.

<First Step>

The first step is a step of preparing a first material raw powder, a second material raw powder, and a cBN powder. First, the first material raw powder may be prepared as follows. For example, WC powder, Co powder and Al powder are produced by a conventionally known method or obtained from the market, and these powders are mixed at a predetermined mass ratio. The predetermined mass ratio is preferably a ratio such that the mass ratio of Al in first material raw powder is 10 mass % or more, for example, from a viewpoint of promoting dissolving Al in the solid state in the second chemical species constituting the second material. Next, the mixture is subjected to heat treatment (for example, 900 to 1300° C.) under vacuum to obtain an intermetallic compound. Subsequently, the intermetallic compound is pulverized with a wet ball mill, a wet bead mill, or the like to prepare the first material raw powder. The mixing method for each powder is not particularly limited, but from a viewpoint of efficient and homogeneous mixing, ball mill mixing, bead mill mixing, planetary mill mixing, jet mill mixing, and the like are preferable. Each mixing method may be a wet method or a dry method. In the preparation of the first material raw powder, when the WC powder, the Co powder, and the Al powder are mixed, a metal powder containing at least one third metallic element selected from the group consisting of Ti, Zr, V, Nb, Hf, Ta, Cr, and Mo or at least one fourth metallic element selected from the group consisting of Ti, Zr, V, Nb, Hf, Ta, Cr, Mo, and W may be further added as a constituent element.

Here, when the third metallic element or the fourth metallic element is dissolved in the solid state in the first material, it is preferable to perform a surface treatment on the first material raw powder to which the metal powder containing the third metallic element or the fourth metallic element is added. Examples of the surface treatment of the first material raw powder include a plasma treatment and an ammonia treatment.

When the surface treatment of the first material raw powder is the plasma treatment, the first material raw powder is exposed to a gas atmosphere containing argon in a plasma generator to etch the surface of the first material raw powder. When the surface treatment of the first material raw powder is performed by the ammonia treatment, the first material raw powder is exposed to a gas atmosphere containing ammonia in a predetermined container to etch the surface of the first material raw powder. As a result, a small amount of the third metallic element or the fourth metallic element can be dissolved in the solid state in the first material raw powder during a pressurized heat treatment described later.

When a large amount of the third metallic element or the fourth metallic element is dissolved in the solid state in the first material, an atomized powder can be used. The atomized powder refers to a powder obtained by melting one element selected as the third metallic element or the fourth metallic element and one (for example, Co) selected as the first material and then rapidly cooling the molten material to be alloyed. When the atomized powder is used, since the powder itself corresponds to an alloy produced from a molten metal including the first material and the third metallic element or the fourth metallic element, the third metallic element or the fourth metallic element is more easily dissolved in the solid state in the first material.

The method of producing the atomized powder is not particularly limited, and a conventionally known atomization method may be applied. For example, by using a gas atomizing method, raw materials (one element selected as the third metallic element or the fourth metallic element, and one selected as the first material) are melted by high-frequency induction heating in an alumina crucible in a vacuum to be alloyed. Subsequently, the molten alloy is dropped from a nozzle immediately below the crucible, and a high-pressure argon or high-pressure nitrogen gas can be sprayed thereto. Thus, the atomized powder composed of the raw materials described above can be obtained.

Next, the second material raw powder may be prepared as follows. First, a second chemical species powder, which is nitride, carbide or carbonitride containing at least one second metallic element selected from the group consisting of Ti, Zr, Hf, V, Nb, Ta and Cr, is produced by a conventionally known method or obtained from the market to be prepared. Next, the second chemical species powder is pulverized with a wet ball mill a bead mill, or the like so that the average particle size ($D_{50}$) of the primary particles of the second chemical species powder is 1 μm or less. Further, the second chemical species powder is surface-treated by performing a plasma treatment or an ammonia treatment on the pulverized second chemical species powder.

When the surface treatment of the second chemical species powder is performed by, for example, the plasma treatment, the second chemical species powder is exposed to a gas atmosphere containing argon in a plasma generator to etch the surface of the second chemical species powder. When the surface treatment of the second chemical species powder is performed by, for example, the ammonia treatment, the second chemical species powder is exposed to a gas atmosphere containing ammonia in a predetermined container to etch the surface of the second chemical species powder. As the gas containing ammonia, a mixed gas of $NH_3$, $N_2$ and $H_2$, or the like may be used. The surface treatment of the second chemical species powder allows a small amount of Al to be dissolved in the solid state in the second chemical species powder during the pressurized heat treatment described later.

Next, a powder containing metal Al or an Al compound (CoAl, $Al_2O_3$, AlN, $AlB_2$, a composite compound thereof, and the like, as described above) is blended with the surface-treated second chemical species powder so that the content of Al in the second chemical species powder is set to 0.1 atom % to 10 atom %, and the mixture is mixed using a wet ball mill or bead mill. Thereafter, the mixed powder of the metal Al or the Al compound and the second chemical species powder is subjected to the pressurized heat treatment, and then pulverized to prepare the second material raw powder. Here, the pressurized heating treatment may be performed under conditions of, for example, 800 to 1300° C., 0.3 to 0.6 MPa, and a holding time of 0.5 to 5 hours.

Further, in the preparation of the second material raw powder, when the metal Al or the Al compound is mixed with the second chemical species powder, a metal powder containing at least one fourth metallic element selected from the group consisting of Ti, Zr, V, Nb, Hf, Ta, Cr, Mo, and W may be further added as a constituent element.

The cBN powder may be produced from B and N by a conventionally known ultra-high pressure synthesis method to be prepared. Further, the cBN powder may be obtained from the market to be prepared. An average particle size of the cBN powder is not particularly limited, but from a viewpoint of forming a cBN sintered material having a high hardness and both an superior wear resistance and a breakage resistance, the average particle size is preferably 0.1 to 10 µm, and more preferably 0.5 to 5 µm.

<Second Step>

The second step is a step of mixing the first material raw powder, the second material raw powder, and the cBN powder to prepare a mixed powder including 70 vol % or more and less than 100 vol % of the cBN powder and more than 0 vol % and 30 vol % or less of the binders (first material and second material). Specifically, in the second step, the first material raw powder, the second material raw powder, and the cBN powder are preferably subjected to a wet ball mill mixing using ethanol, acetone, or the like as a solvent to prepare the mixed powder. The mixing ratio (mass ratio) of the first material raw powder and the second material raw powder is preferably set to 10:1 to 1:10 as a ratio of first material raw powder:second material raw powder. After the preparation of the mixed powder, the solvent is removed by natural drying. Further, the mixed powder is preferably subjected to a heat treatment (for example, at 850° C. or higher under vacuum) because impurities such as moisture adsorbed on the surface can be removed.

<Third Step>

The third step is a step of sintering the mixed powder to obtain a cBN sintered material. In this step, the mixed powder is sintered under high-temperature and high-pressure conditions to produce a cBN sintered material. Specifically, in the third step, the vacuum-sealed mixed powder is sintered by using an ultra-high temperature and high pressure apparatus. The temperature condition for the sintering process is preferably 1500° C. or higher and lower than 2000° C., and more preferably 1600° C. to 1900° C. The holding time is preferably 10 to 60 minutes. Although the sintering pressure condition is not particularly limited, it is preferably 5.5 to 8 GPa. In this manner, the cBN sintered material may be produced.

<Function and Effect>

In the method of producing a cBN sintered material according to the present embodiment, a cBN sintered material that enable a longer tool life can be produced through the steps described above.

EXAMPLES

Hereinafter, the present invention will be described in more detail with reference to Examples, but the present invention is not limited thereto.

[Sample Preparation]

The following procedure is used to prepare cBN sintered materials for Samples 1 to 80. The cBN sintered materials of Samples 1 to 23, Samples 25 to 28, Samples 31 to 34, Samples 36 to 54, Samples 56 to 59, and Samples 60 to 80 are Examples. The cBN sintered materials of Sample 24, Samples 29 to 30, Sample 35, and Sample 55 are Comparative Examples.

<Sample 1>

(First Step)

First, commercially available WC powder (trade name: "WC20", manufactured by A.L.M.T. Corp.), Co powder (trade name: "S series", manufactured by Freeport Cobalt Oy), and Al powder (trade name: "#900", manufactured by Minalco Co., Ltd.) were prepared. Next, the above powders were mixed under an inert atmosphere of argon so that the mass ratio of WC:Co:Al was set to 3:8:2. The average grain size of each of the powders was 1 µm. Further, the powder mixed at the above mass ratio was subjected to a heat treatment at 1200° C. under vacuum to produce an intermetallic compound. The intermetallic compound was pulverized with a wet bead mill. In this manner, a first material raw powder was prepared.

Next, a commercially available TiN powder (manufactured by Kennametal Inc.) was obtained as a powder (second chemical species powder) for preparing a second material raw powder, and this powder was pulverized with a bead mill until the average grain size became 0.3 µm. Further, the TiN powder having a grain size of 0.3 µm was subjected to a plasma treatment under a gas atmosphere containing argon for 30 minutes using a surface plasma apparatus (trade name: "FEMTO-LFS", manufactured by Diener Electronic GmbH) to perform a surface treatment thereon.

Next, an AlN powder (manufactured by Tokuyama Corporation) was added to the surface-treated TiN powder so that the content of Al in the second material raw powder was set to 4 atom %, and the mixture was mixed while being pulverized with a wet bead mill. Further, the mixed powder of the TiN powder and the AlN powder was subjected to a pressurized heat treatment and then pulverized to prepare the second material raw powder. The pressurized heat treatment was carried out for 3 hours under conditions of 900° C. and 0.3 MPa. Further, a cBN powder having an average grain size of 1 µm was prepared by a conventionally known ultra-high pressure synthesis method.

(Second Step)

The first material raw powder, the second material raw powder, and the cBN powder were blended so that the mass ratio of cBN powder:first material raw powder:second material raw powder was set to 90:4.0:6.0, and uniformly mixed by a wet ball mill method using ethanol. Thereafter, the solvent was removed by natural drying, and the mixed powder was subjected to a heat treatment at 900° C. under vacuum. In this manner, a mixed powder was prepared.

(Third Step)

The mixed powder was sintered to produce a cBN sintered material. Specifically, the mixed powder was filled in a Ta (tantalum) container in a state where the mixed powder was in contact with a WC-6% Co cemented carbide disk and a Co foil, and then the container was vacuum-sealed. Next, the mixed powder was sintered for 15 minutes under conditions of 7 GPa and 1700° C. using a belt-type ultra-high pressure and high temperature generating apparatus. As described above, the cBN sintered material of Sample 1 was prepared. The solid solution amount of Al in the second material (TiN) of the cBN sintered material of Sample 1 was 5 atom % according to the above-described analysis using the TEM-EDX. In addition, since the mixed powder was sintered in a state of being in contact with the cemented carbide disk and the Co foil, the cBN content in the sample was decreased from the prepared amount (95 vol %), and was a value shown in Table 1.

<Sample 2>

The cBN sintered material of Sample 2 was prepared in the same manner as in Sample 1 except that a ZrN powder (manufactured by Kojundo Chemical Laboratory Co., Ltd.) was used as the second chemical species powder for preparing the second material raw powder in the first step.

<Sample 3>

The cBN sintered material of Sample 3 was produced in the same manner as in Sample 1 except that a HfN powder (manufactured by Kojundo Chemical Laboratory Co., Ltd.) was used as the second chemical species powder for preparing the second material raw powder in the first step.

<Sample 4>

The cBN sintered material of Sample 4 was produced in the same manner as in Sample 1 except that a VN powder (manufactured by Kojundo Chemical Laboratory Co., Ltd.) was used as the second chemical species powder for preparing the second material raw powder in the first step.

<Sample 5>

The cBN sintered material of Sample 5 was produced in the same manner as in Sample 1 except that a NbN powder (manufactured by Japan New Metals Co., Ltd.) was used as the second chemical species powder for preparing the second material raw powder in the first step.

<Sample 6>

The cBN sintered material of Sample 6 was produced in the same manner as in Sample 1 except that a TaN powder (manufactured by Kojundo Chemical Laboratory Co., Ltd.) was used as the second chemical species powder for preparing the second material raw powder in the first step.

<Sample 7>

The cBN sintered material of Sample 7 was produced in the same manner as in Sample 1 except that a CrN powder was used as the second chemical species powder for preparing the second material raw powder in the first step. The CrN powder was prepared by subjecting a $Cr_2N$ powder (manufactured by Japan New Metals Co., Ltd.) to a pressurized heat treatment at 900° C. and 0.3 MPa under a nitrogen gas atmosphere.

<Sample 8>

The cBN sintered material of Sample 8 was produced in the same manner as in Sample 1 except that a TiC powder (manufactured by Kojundo Chemical Laboratory Co., Ltd.) was used as the second chemical species powder for preparing the second material raw powder in the first step, and that the TiC powder was subjected to a surface treatment by an ammonia treatment under the following conditions instead of the plasma treatment.

(Ammonia Treatment Conditions)

Ammonia flow rate: 0.5 L/min

Nitrogen flow rate: 5 L/min

Furnace pressure: atmospheric pressure

Furnace temperature: 1000° C.

Holding time: 4 hours.

<Sample 9>

The cBN sintered material of Sample 9 was produced in the same manner as in Sample 1 except that a ZrC powder (manufactured by Kojundo Chemical Laboratory Co., Ltd.) was used as the second chemical species powder for preparing the second material raw powder in the first step, and that the ZrC powder was subjected to a surface treatment by an ammonia treatment in the same manner as in Sample 8 instead of the plasma treatment.

<Sample 10>

The cBN sintered material of Sample 10 was produced in the same manner as in Sample 1 except that a HfC powder (manufactured by Kojundo Chemical Laboratory Co., Ltd.) was used as the second chemical species powder for preparing the second material raw powder in the first step, and that the HfC powder was subjected to a surface treatment by an ammonia treatment in the same manner as in Sample 8 instead of the plasma treatment.

<Sample 11>

The cBN sintered material of Sample 11 was produced in the same manner as in Sample 1 except that a VC powder (manufactured by Kojundo Chemical Laboratory Co., Ltd.) was used as the second chemical species powder for preparing the second material raw powder in the first step, and that the VC powder was subjected to a surface treatment by an ammonia treatment in the same manner as in Sample 8 instead of the plasma treatment.

<Sample 12>

The cBN sintered material of Sample 12 was produced in the same manner as in Sample 1 except that a NbC powder (manufactured by Japan New Metals Co., Ltd.) was used as the second chemical species powder for preparing the second material raw powder in the first step, and that the NbC powder was subjected to a surface treatment by an ammonia treatment in the same manner as in Sample 8 instead of the plasma treatment.

<Sample 13>

The cBN sintered material of Sample 13 was produced in the same manner as in Sample 1 except that a TaC powder (manufactured by Kojundo Chemical Laboratory Co., Ltd.) was used as the second chemical species powder for preparing the second material raw powder in the first step, and that the TaC powder was subjected to a surface treatment by an ammonia treatment in the same manner as in Sample 8 instead of the plasma treatment.

<Sample 14>

The cBN sintered material of Sample 14 was produced in the same manner as in Sample 1 except that a TiCN powder was used as the second chemical species powder for preparing the second material raw powder in the first step, and that the TiCN powder was subjected to a surface treatment by an ammonia treatment in the same manner as in Sample 8 instead of the plasma treatment. The TiCN powder was prepared by mixing the TiC powder (manufactured by Kojundo Chemical Laboratory Co., Ltd.) and the TiN powder (manufactured by Kenametal Inc.) using a wet ball mill to obtain a mixed powder, pressing the mixed powder using a die, firing the pressed powder at 2200° C. in an argon atmosphere, and then pulverizing the fired powder.

<Sample 15>

The cBN sintered material of Sample 15 was produced in the same manner as in Sample 1 except that a ZrCN powder was used as the second chemical species powder for preparing the second material raw powder in the first step, and that the ZrCN powder was subjected to a surface treatment by an ammonia treatment in the same manner as in Sample 8 instead of the plasma treatment. The ZrCN powder was prepared by mixing the ZrC powder (manufactured by Kojundo Chemical Laboratory Co., Ltd.) and the ZrN powder (manufactured by Kojundo Chemical Laboratory Co., Ltd.) using a wet ball mill to obtain a mixed powder, pressing the mixed powder using a die, firing the pressed powder at 2200° C. in an argon atmosphere, and then pulverizing the fired powder.

<Sample 16>

The cBN sintered material of Sample 16 was produced in the same manner as in Sample 1 except that a HfCN powder was used as the second chemical species powder for preparing the second material raw powder in the first step, and that the HfCN powder was subjected to a surface treatment by an ammonia treatment in the same manner as in Sample 8 instead of the plasma treatment. The HfCN powder was prepared by mixing the HfC powder (manufactured by Kojundo Chemical Laboratory Co., Ltd.) and the HfN powder (manufactured by Kojundo Chemical Laboratory Co., Ltd.) using a wet ball mill to obtain a mixed powder, pressing the mixed powder using a die, firing the pressed powder at 2200° C. in an argon atmosphere, and then pulverizing the fired powder.

<Sample 17>

The cBN sintered material of Sample 17 was produced in the same manner as in Sample 1 except that a VCN powder was used as the second chemical species powder for preparing the second material raw powder in the first step, and that the VCN powder was subjected to a surface treatment by an ammonia treatment in the same manner as in Sample 8 instead of the plasma treatment. The VCN powder was prepared by mixing the VC powder (manufactured by Kojundo Chemical Laboratory Co., Ltd.) and the VN powder (manufactured by Kojundo Chemical Laboratory Co., Ltd.) using a wet ball mill to obtain a mixed powder, pressing the mixed powder using a die, firing the pressed powder at 2200° C. in an argon atmosphere, and then pulverizing the fired powder.

<Sample 18>

The cBN sintered material of Sample 18 was produced in the same manner as in Sample 1 except that NbCN powder was used as the second chemical species powder for preparing the second material raw powder in the first step, and that the NbCN powder was subjected to a surface treatment by an ammonia treatment in the same manner as in Sample 8 instead of the plasma treatment. The NbCN powder was prepared by mixing the NbC powder (manufactured by Japan New Metals Co., Ltd.) and the NbN powder (manufactured by Japan New Metals Co., Ltd.) using a wet ball mill to obtain a mixed powder, pressing the mixed powder using a die, firing the pressed powder at 2200° C. in an argon atmosphere, and then pulverizing the fired powder.

<Sample 19>

The cBN sintered material of Sample 19 was produced in the same manner as in Sample 1 except that TaCN powder was used as the second chemical species powder for preparing the second material raw powder in the first step, and that the TaCN powder was subjected to a surface treatment by an ammonia treatment in the same manner as in Sample 8 instead of the plasma treatment. The TaCN powder was prepared by mixing the TaC powder (manufactured by Kojundo Chemical Laboratory Co., Ltd.) and the TaN powder (manufactured by Kojundo Chemical Laboratory Co., Ltd.) using a wet ball mill to obtain a mixed powder, pressing the mixed powder using a die, firing the pressed powder at 2200° C. in an argon atmosphere, and then pulverizing the fired powder.

<Sample 20>

The cBN sintered material of Sample 20 was produced in the same manner as in Sample 1 except that in the first step, an AlN powder (manufactured by Tokuyama Corporation) was added to the surface-treated TiN powder so that the content of Al in the second material raw powder was set to 2 atom %, and then the mixture was mixed while being pulverized with a wet bead mill. The solid solution amount of Al in the second material (TiN) of the cBN sintered material of Sample 20 was 3 atom % according to the above-described analysis using the TEM-EDX.

<Sample 21>

The cBN sintered material of Sample 21 was produced in the same manner as in Sample 1 except that in the first step, the powders for obtaining the first material raw powder were mixed so that the mass ratio of WC:Co:Al was set to 3:8:1, and that an AlN powder (manufactured by Tokuyama Corporation) was added to the surface-treated TiN powder so that the content of Al in the second material raw powder was set to 0.1 atom %, and then the mixture was mixed while being pulverized with a wet bead mill. The solid solution amount of Al in the second material (TiN) of the cBN sintered material of Sample 21 was 0.1 atom % according to the above-described analysis using the TEM-EDX.

<Sample 22>

The cBN sintered material of Sample 22 was produced in the same manner as in Sample 1 except that in the first step, an AlN powder (manufactured by Tokuyama Corporation) was added to the surface-treated TiN powder so that the content of Al in the second material raw powder was set to 6 atom %, and then the mixture was mixed while being pulverized with a wet bead mill. The solid solution amount of Al in the second material (TiN) of the cBN sintered material of Sample 22 was 7 atom % according to the above-described analysis using the TEM-EDX.

<Sample 23>

The cBN sintered material of Sample 23 was produced in the same manner as in Sample 1 except that in the first step, an AlN powder (manufactured by Tokuyama Corporation) was added to the surface-treated TiN powder so that the content of Al in the second material raw powder was set to 9 atom %, and then the mixture was mixed while being pulverized with a wet bead mill. The solid solution amount of Al in the second material (TiN) of the cBN sintered material of Sample 23 was 10 atom % according to the above-described analysis using the TEM-EDX.

<Sample 24>

The cBN sintered material of Sample 24 was produced in the same manner as in Sample 1 except that in the first step, an AlN powder (manufactured by Tokuyama Corporation) was added to the surface-treated TiN powder so that the content of Al in the second material raw powder was set to 14 atom %, and then the mixture was mixed while being pulverized with a wet bead mill. The solid solution amount of Al in the second material (TiN) of the cBN sintered material of Sample 24 was 15 atom % according to the above-described analysis using the TEM-EDX.

<Sample 25>

The cBN sintered material of Sample 25 was produced in the same manner as in Sample 7 except that in the first step, an AlN powder (manufactured by Tokuyama Corporation) was added to the surface-treated CrN powder so that the content of Al in the second material raw powder was set to 2 atom %, and then the mixture was mixed while being pulverized with a wet bead mill. The solid solution amount of Al in the second material (CrN) of the cBN sintered material of Sample 25 was 3 atom % according to the above-described analysis using the TEM-EDX.

<Sample 26>

The cBN sintered material of Sample 26 was produced in the same manner as in Sample 7 except that in the first step, the powders for obtaining the first material raw powder were mixed so that the mass ratio of WC:Co:Al was set to 3:8:1, and that an AlN powder (manufactured by Tokuyama Corporation) was added to the surface-treated CrN powder so that the content of Al in the second material raw powder was set to 0.1 atom %, and then the mixture was mixed while being pulverized with a wet bead mill. The solid solution amount of Al in the second material (CrN) of the cBN sintered material of Sample 26 was 0.1 atom % according to the above-described analysis using the TEM-EDX.

<Sample 27>

The cBN sintered material of Sample 27 was produced in the same manner as in Sample 7 except that in the first step, an AlN powder (manufactured by Tokuyama Corporation) was added to the surface-treated CrN powder so that the content of Al in the second material raw powder was set to 6 atom %, and then the mixture was mixed while being pulverized with a wet bead mill. The solid solution amount of Al in the second material (CrN) of the cBN sintered material of Sample 27 was 7 atom % according to the above-described analysis using the TEM-EDX.

<Sample 28>

The cBN sintered material of Sample 28 was produced in the same manner as in Sample 7 except that in the first step, an AlN powder (manufactured by Tokuyama Corporation) was added to the surface-treated CrN powder so that the content of Al in the second material raw powder was set to 9 atom %, and then the mixture was mixed while being pulverized with a wet bead mill. The solid solution amount of Al in the second material (CrN) of the cBN sintered material of Sample 28 was 10 atom % according to the above-described analysis using the TEM-EDX.

<Sample 29>

The cBN sintered material of Sample 29 was produced in the same manner as in Sample 7 except that in the first step, an AlN powder (manufactured by Tokuyama Corporation) was added to the surface-treated CrN powder so that the content of Al in the second material raw powder was set to 14 atom %, and then the mixture was mixed while being pulverized with a wet bead mill. The solid solution amount of Al in the second material (CrN) of the cBN sintered material of Sample 29 was 15 atom % according to the above-described analysis using the TEM-EDX.

<Sample 30>

The cBN sintered material of Sample 30 was produced in the same manner as in Sample 1 except that the cBN powder, the first material raw powder, and the second material raw powder were not mixed in the second step, and that 100 mass % of the cBN powder was sintered under conditions of 15 GPa and 2200° C. for 15 minutes in the third step.

<Sample 31>

The cBN sintered material of Sample 31 was produced in the same manner as in Sample 25 except that in the second step, the cBN powder, the first material raw powder, and the second material raw powder were mixed so that the mass ratio of cBN powder:first material raw powder:second material raw powder was set to 98:1:1, and that in the third step, the mixed powder was filled in a Ta (tantalum) container without adding a WC-6% Co cemented carbide disk and a Co foil and sintered. Here, when the mixed powder was filled in the Ta (tantalum) container without adding the WC-6% Co cemented carbide disk and the Co foil and sintered, the cBN content in the sample coincided with the charged amount (99 vol %) as shown in Table 1.

<Sample 32>

The cBN sintered material of Sample 32 was produced in the same manner as in Sample 25 except that in the third step, the mixed powder was filled in a Ta (tantalum) container without adding a WC-6% Co cemented carbide disk and a Co foil and sintered.

<Sample 33>

The cBN sintered material of Sample 33 was produced in the same manner as in Sample 25 except that in the second step, the cBN powder, the first material raw powder, and the second material raw powder were mixed so that the mass ratio of cBN powder:first material raw powder:second material raw powder was set to 90:5:5, and that the cBN powder was sintered under conditions of 6.5 GPa and 1700° C. for 15 minutes in the third step.

<Sample 34>

The cBN sintered material of Sample 34 was produced in the same manner as in Sample 25 except that in the second step, the cBN powder, the first material raw powder, and the second material raw powder were mixed so that the mass ratio of cBN powder:first material raw powder:second material raw powder was set to 90:5:5, and that the cBN powder was sintered under conditions of 5.5 GPa and 1700° C. for 15 minutes in the third step.

<Sample 35>

The cBN sintered material of Sample 35 was produced in the same manner as in Sample 25 except that in the second step, the cBN powder, the first material raw powder, and the second material raw powder were mixed so that the mass ratio of cBN powder:first material raw powder:second material raw powder was set to 90:5:5, and that the cBN powder was sintered under conditions of 4.5 GPa and 1700° C. for 15 minutes in the third step.

<Sample 36>

The cBN sintered material of Sample 36 was produced in the same manner as in Sample 25 except that in the second step, the cBN powder, the first material raw powder, and the second material raw powder were mixed so that the mass ratio of cBN powder:first material raw powder:second material raw powder was set to 90:3.3:6.7 by setting the mixing ratio of the first material raw powder to the second material raw powder to 1:2 in terms of mass ratio.

<Sample 37>

The cBN sintered material of Sample 37 was produced in the same manner as in Sample 25 except that in the second step, the cBN powder, the first material raw powder, and the second material raw powder were mixed so that the mass ratio of cBN powder:first material raw powder:second material raw powder was set to 90:6.7:3.3 by setting the mixing ratio of the first material raw powder to the second material raw powder to 2:1 in terms of mass ratio.

<Sample 38>

The cBN sintered material of Sample 38 was produced in the same manner as in Sample 25 except that in the second step, the cBN powder, the first material raw powder, and the second material raw powder were mixed so that the mass ratio of cBN powder:first material raw powder:second material raw powder was set to 90:2:8 by setting the mixing ratio of the first material raw powder to the second material raw powder to 1:4 in terms of mass ratio.

<Sample 39>

The cBN sintered material of Sample 39 was produced in the same manner as in Sample 25 except that in the second step, the cBN powder, the first material raw powder, and the second material raw powder were mixed so that the mass ratio of cBN powder:first material raw powder:second material raw powder was set to 90:8:2 by setting the mixing ratio of the first material raw powder to the second material raw powder to 4:1 in terms of mass ratio.

<Sample 40>

The cBN sintered material of Sample 40 was produced in the same manner as in Sample 25 except that in the second step, the cBN powder, the first material raw powder, and the second material raw powder were mixed so that the mass ratio of cBN powder:first material raw powder:second material raw powder was set to 90:1:9 by setting the mixing ratio of the first material raw powder to the second material raw powder to 1:9 in terms of mass ratio.

<Sample 41>

The cBN sintered material of Sample 41 was produced in the same manner as in Sample 36 except that in the first step, a first material raw powder was obtained by preparing a commercially available Ti powder (manufactured by OSAKA Titanium technologies Co., Ltd.) in addition to the commercially available WC powder, Co powder, and Al powder and mixing these powders so that the mass ratio of WC:Co:Al:Ti was set to 3:8:0.7:0.3, and that the Ti powder was subjected in advance to a plasma treatment under a gas atmosphere containing argon for 30 minutes using a surface plasma apparatus to perform a surface treatment thereon. In Sample 41, it was confirmed by the above-described TEM-EDX that the fourth metallic element (Ti) was dissolved in the solid state in the first material and the second material by the plasma treatment.

<Sample 42>

The cBN sintered material of Sample 42 was produced in the same manner as in Sample 41 except that in the first step, in order to obtain a first material raw powder, a ZrC powder (manufactured by Kojundo Chemical Laboratory Co., Ltd.) was used instead of the Ti powder as a powder which was to be prepared together with the commercially available WC powder, Co powder, and Al powder and subjected to a plasma treatment in advance. In Sample 42, it was confirmed by the above-described TEM-EDX that the fourth metallic element (Zr) was dissolved in the solid state in the first material and the second material by the plasma treatment.

<Sample 43>

The cBN sintered material of Sample 43 was produced in the same manner as in Sample 41 except that in the first step, in order to obtain a first material raw powder, a HfC powder (manufactured by Kojundo Chemical Laboratory Co., Ltd.) was used instead of the Ti powder as a powder which was to be prepared together with the commercially available WC powder, Co powder, and that Al powder and subjected to a plasma treatment in advance. In Sample 43, it was confirmed by the above-described TEM-EDX that the fourth metallic element (Hf) was dissolved in the solid state in the first material and the second material by the plasma treatment.

<Sample 44>

The cBN sintered material of Sample 44 was produced in the same manner as in Sample 41 except that in the first step, in order to obtain a first material raw powder, a VC powder (manufactured by Kojundo Chemical Laboratory Co., Ltd.) was used instead of the Ti powder as a powder which was to be prepared together with the commercially available WC powder, Co powder, and that Al powder and subjected to a plasma treatment in advance. In Sample 44, it was confirmed by the above-described TEM-EDX that the fourth metallic element (V) was dissolved in the solid state in the first material and the second material by the plasma treatment.

<Sample 45>

The cBN sintered material of Sample 45 was produced in the same manner as in Sample 41 except that in the first step, in order to obtain a first material raw powder, a NbC powder (manufactured by Japan New Metals Co., Ltd.) was used instead of the Ti powder as a powder which was to be prepared together with the commercially available WC powder, Co powder, and that Al powder and subjected to a plasma treatment in advance. In Sample 45, it was confirmed by the above-described TEM-EDX that the fourth metallic element (Nb) was dissolved in the solid state in the first material and the second material by the plasma treatment.

<Sample 46>

The cBN sintered material of Sample 46 was produced in the same manner as in Sample 41 except that in the first step, in order to obtain a first material raw powder, a TaC powder (manufactured by Kojundo Chemical Laboratory Co., Ltd.) was used instead of the Ti powder as a powder which was to be prepared together with the commercially available WC powder, Co powder, and Al powder and subjected to a plasma treatment in advance. In Sample 46, it was confirmed by the above-described TEM-EDX that the fourth metallic element (Ta) was dissolved in the solid state in the first material and the second material by the plasma treatment.

<Sample 47>

The cBN sintered material of Sample 47 was produced in the same manner as in Sample 41 except that in the first step, in order to obtain a first material raw powder, a $Cr_2N$ powder (manufactured by Japan New Metals Co., Ltd.) was used instead of the Ti powder as a powder which was to be prepared together with the commercially available WC powder, Co powder, and Al powder and subjected to a plasma treatment in advance. In Sample 47, it was confirmed by the above-described TEM-EDX that the fourth metallic element (Cr) was dissolved in the solid state in the first material and the second material by the plasma treatment.

<Sample 48>

The cBN sintered material of Sample 48 was produced in the same manner as in Sample 41 except that in the first step, in order to obtain a first material raw powder, a Mo powder (manufactured by A.L.M.T. Corp.) was used instead of the Ti powder as a powder which was to be prepared together with the commercially available WC powder, Co powder, and Al powder and subjected to a plasma treatment in advance. In Sample 48, it was confirmed by the above-described TEM-EDX that the fourth metallic element (Mo) was dissolved in the solid state in the first material and the second material by the plasma treatment.

<Sample 49>

The cBN sintered material of Sample 49 was produced in the same manner as in Sample 41 except that in the first step, in order to obtain a first material raw powder, a W powder (manufactured by A.L.M.T. Corp.) was used instead of the Ti powder as a powder which was to be prepared together with the commercially available WC powder, Co powder, and Al powder and subjected to a plasma treatment in advance. In Sample 49, it was confirmed by the above-described TEM-EDX that the fourth metallic element (W) was dissolved in the solid state in the first material and the second material by the plasma treatment.

<Sample 50>

The cBN sintered material of Sample 50 was produced in the same manner as in Sample 41 except that in the first step, the powders for obtaining the first material raw powder were mixed so that the mass ratio of WC:Co:Al:Ti was set to 3:8.5:0.4:0.1. In Sample 50, it was confirmed by the above-described TEM-EDX that the fourth metallic element (Ti) was dissolved in the solid state in the first material and the second material by the plasma treatment of the Ti powder.

<Sample 51>

The cBN sintered material of Sample 51 was produced in the same manner as in Sample 50 except that in the first step, in order to obtain a first material raw powder, a $Cr_2N$ powder (manufactured by Japan New Metals Co., Ltd.) was used instead of the Ti powder as a powder which was to be prepared together with the commercially available WC powder, Co powder, and Al powder and subjected to a plasma treatment in advance. In Sample 51, it was confirmed by the above-described TEM-EDX that the fourth metallic element (Cr) was dissolved in the solid state in the first material and the second material by the plasma treatment of the $Cr_2N$ powder.

<Sample 52>

The cBN sintered material of Sample 52 was produced in the same manner as in Sample 51 except that in the first step, the plasma treatment time for the CrN powder prepared as the second chemical species powder for producing the second material raw powder was set to 60 minutes.

<Sample 53>

The cBN sintered material of Sample 53 was produced in the same manner as in Sample 51 except that in the first step, the plasma treatment time for the CrN powder prepared as the second chemical species powder for producing the second material raw powder was set to 90 minutes.

<Sample 54>

The cBN sintered material of Sample 54 was produced in the same manner as in Sample 51 except that in the first step, the plasma treatment was not performed on the CrN powder prepared as the second chemical species powder for producing the second material raw powder.

<Sample 55>

The cBN sintered material of Sample 55 was produced in the same manner as in Sample 7 except that in the first step, the CrN powder prepared as a powder for producing the second material raw powder was not pulverized, but only sieving was performed using a sieve having a mesh size of 150 μm.

<Sample 56>

The cBN sintered material of Sample 56 was produced in the same manner as in Sample 42 except that in the first step, the ZrC powder (manufactured by Kojundo Chemical Laboratory Co., Ltd.) which was prepared together with the commercially available WC powder, Co powder, and Al powder was not subjected to the plasma treatment, but the WC powder, Co powder, and Al powder were subjected to the plasma treatment to obtain a first material raw powder. It is considered that in Sample 56, since the ZrC powder was not subjected to the plasma treatment, the fourth metallic element (Zr) was not dissolved in the solid state in the second material, but the third metallic element (Zr) was dissolved in the solid state only in the first material.

<Sample 57>

The cBN sintered material of Sample 57 was produced in the same manner as in Sample 7 except that in the first step, the ZrN powder (manufactured by Kojundo Chemical Laboratory Co., Ltd.) subjected to the plasma treatment was mixed with a CrN powder at an atomic ratio of Cr:Zr of 94:3 to prepare a powder for producing the second material raw powder.

<Sample 58>

The cBN sintered material of Sample 58 was produced in the same manner as in Sample 56 except that in the first step, the powders for obtaining the first material raw powder were mixed so that the mass ratio of WC:Co:Al:ZrC was set to 3:8.5:0.4:0.1. It is considered that in Sample 58, since the ZrC powder was not subjected to the plasma treatment, the fourth metallic element (Zr) was not dissolved in the solid state in the second material, but the third metallic element (Zr) was dissolved in the solid state only in the first material.

<Sample 59>

The cBN sintered material of Sample 59 was produced in the same manner as in Sample 57 except that in the first step, the CrN powder and the ZrN powder which were to be prepared as powders for producing the second material raw powder were mixed so that the atomic ratio of Cr:Zr was set to 96.5:0.5.

<Sample 60>

The cBN sintered material of Sample 60 was produced in the same manner as in Sample 47 except that in the first step, in order to obtain a first material raw powder, a CoCr atomized powder was prepared together with the commercially available WC powder and Al powder, the CoCr atomized powder was not subjected to a plasma treatment, and the above powders were mixed so that the mass ratio of WC:CoCr:Al was set to 3:8.3:0.7. It is considered that in sample 60, the third metallic element (Cr) was not dissolved in the solid state in the second material because the CoCr atomized powder was not subjected to the plasma treatment. The CoCr atomized powder was synthesized at a mass ratio of Co:Cr=5.9:2.4 by the above-described method using a gas atomizing method. In order to form a more uniform solid solution, the plasma treatment described above was performed on both the metal powders of Co and Cr as raw materials.

<Sample 61>

The cBN sintered material of Sample 61 was produced in the same manner as in Sample 60 except that in the first step, a CoCr atomized powder prepared for obtaining a first material raw powder was synthesized at a mass ratio of Co:Cr=6.4:1.9 by the above-described method using the gas atomization method.

<Sample 62>

The cBN sintered material of Sample 62 was produced in the same manner as in Sample 60 except that in the first step, a CoCr atomized powder prepared for obtaining a first material raw powder was synthesized at a mass ratio of Co:Cr=6.8:1.5 by the above-described method using the gas atomization method.

<Sample 63>

The cBN sintered material of Sample 63 was produced in the same manner as in Sample 60 except that in the first step, a CoCr atomized powder prepared for obtaining a first material raw powder was synthesized at a mass ratio of Co:Cr=7.3:1.0 by the above-described method using the gas atomization method.

<Sample 64>

The cBN sintered material of Sample 64 was produced in the same manner as in Sample 60 except that in the first step, a CoCr atomized powder prepared for obtaining a first material raw powder was synthesized at a mass ratio of Co:Cr=7.7:0.6 by the above-described method using the gas atomization method.

<Sample 65>

The cBN sintered material of Sample 65 was produced in the same manner as in Sample 60 except that in the first step, a CoCr atomized powder prepared for obtaining a first material raw powder was synthesized at a mass ratio of Co:Cr=5.6:2.7 by the above-described method using the gas atomization method.

<Sample 66>

The cBN sintered material of Sample 66 was produced in the same manner as in Sample 47 except that in the first step, in order to obtain a first material raw powder, a CoTi atomized powder was prepared together with the commercially available WC powder and Al powder, the CoTi atomized powder was not subjected to a plasma treatment, and the powders were mixed so that the mass ratio of WC:CoTi:Al was set to 3:7.3:0.7. It is considered that in Sample 66, the third metallic element (Ti) was not dissolved in the solid state in the second material because the CoTi atomized powder was not subjected to the plasma treatment. The CoTi atomized powder was synthesized at a mass ratio of Co:Ti=5.6:1.7 by the above-described method using the gas atomizing method. In order to form a more uniform solid solution, the plasma treatment described above was performed on both the metal powders of Co and Ti as raw materials.

<Sample 67>

The cBN sintered material of Sample 67 was produced in the same manner as in Sample 47 except that in the first step, in order to obtain a first material raw powder, a CoZr atomized powder was prepared together with the commercially available WC powder and Al powder, the CoZr atomized powder was not subjected to a plasma treatment, and the powders were mixed so that the mass ratio of WC:CoZr:Al was set to 3:8.8:0.7. It is considered that in Sample 67, the third metallic element (Zr) was not dissolved in the solid state in the second material because the CoZr atomized powder was not subjected to the plasma treatment. The CoZr atomized powder was synthesized at a mass ratio of Co:Zr=5.6:3.2 by the above-described method using the gas atomizing method. In order to form a more uniform solid solution, the plasma treatment described above was performed on both the metal powders of Co and Zr as raw materials.

<Sample 68>

The cBN sintered material of Sample 68 was produced in the same manner as in Sample 47 except that in the first step, in order to obtain a first material raw powder, a CoHf atomized powder was prepared together with the commercially available WC powder and Al powder, the CoHf atomized powder was not subjected to a plasma treatment, and the powders were mixed so that the mass ratio of WC:CoHf:Al was set to 3:12:0.7. It is considered that in Sample 68, the third metallic element (Hf) was not dissolved in the solid state in the second material because the CoHf atomized powder was not subjected to the plasma treatment. The CoHf atomized powder was synthesized at a mass ratio of Co:Hf=5.6:6.4 by the above-described method using the gas atomizing method. In order to form a more uniform solid solution, the plasma treatment described above was performed on both the metal powders of Co and Hf as raw materials.

<Sample 69>

The cBN sintered material of Sample 69 was produced in the same manner as in Sample 47 except that in the first step, in order to obtain a first material raw powder, a CoV atomized powder was prepared together with the commercially available WC powder and Al powder, the CoV atomized powder was not subjected to a plasma treatment, and the powders were mixed so that the mass ratio of WC:CoV:Al was set to 3:7.4:0.7. It is considered that in Sample 69, the third metallic element (V) was not dissolved in the solid state in the second material because the CoV atomized powder was not subjected to the plasma treatment. The CoV atomized powder was synthesized at a mass ratio of Co:V=5.6:1.8 by the above-described method using the gas atomizing method. In order to form a more uniform solid solution, the plasma treatment described above was performed on both the metal powders of Co and V as raw materials.

<Sample 70>

The cBN sintered material of Sample 70 was produced in the same manner as in Sample 47 except that in the first step, in order to obtain a first material raw powder, a CoNb atomized powder was prepared together with the commercially available WC powder and Al powder, the CoNb atomized powder was not subjected to a plasma treatment, and the powders were mixed so that the mass ratio of WC:CoNb:Al was set to 3:8.8:0.7. It is considered that in Sample 70, the third metallic element (Nb) was not dissolved in the solid state in the second material because the CoNb atomized powder was not subjected to a plasma treatment. The CoNb atomized powder was synthesized at a mass ratio of Co:Nb=5.6:3.2 by the above-described method using the gas atomizing method. In order to form a more uniform solid solution, the plasma treatment described above was performed on both the metal powders of Co and Nb as raw materials.

<Sample 71>

The cBN sintered material of Sample 71 was produced in the same manner as in Sample 47 except that in the first step, in order to obtain a first material raw powder, a CoTa atomized powder was prepared together with the commercially available WC powder and Al powder, the CoTa atomized powder was not subjected to a plasma treatment, and the powders were mixed so that the mass ratio of WC:CoTa:Al was set to 3:12:0.7. It is considered that in Sample 71, the third metallic element (Ta) was not dissolved in the solid state in the second material because the CoTa atomized powder was not subjected to the plasma treatment. The CoTa atomized powder was synthesized at a mass ratio of Co:Ta=5.6:6.4 by the above-described method using the gas atomizing method. In order to form a more uniform solid solution, the plasma treatment described above was performed on both the metal powders of Co and Ta as raw materials.

<Sample 72>

The cBN sintered material of Sample 72 was produced in the same manner as in Sample 47 except that in the first step, in order to obtain a first material raw powder, a CoMo atomized powder was prepared together with the commercially available WC powder and Al powder, the CoMo atomized powder was not subjected to a plasma treatment, and the powders were mixed so that the mass ratio of WC:CoMo:Al was set to 3:9:0.7. It is considered that in Sample 72, the third metallic element (Mo) was not dissolved in the solid state in the second material because the CoMo atomized powder was not subjected to the plasma treatment. The CoMo atomized powder was synthesized at a mass ratio of Co:Mo=5.6:3.4 by the above-described method using the gas atomizing method. In order to form a more uniform solid solution, the plasma treatment described above was performed on both the metal powders of Co and Mo as raw materials.

<Sample 73>

The cBN sintered material of Sample 73 was produced in the same manner as in Sample 66 except that in the first step, the commercially available WC powder, Al powder, and a CoTi atomized powder which were prepared for obtaining a first material raw powder were mixed so that the mass ratio of WC:CoTi:Al was set to 3:5.7:0.7. The CoTi atomized powder was synthesized at a mass ratio of Co:Ti=5.6:0.1 by the above-described method using the gas atomizing method. In order to form a more uniform solid solution, the plasma treatment described above was performed on both the metal powders of Co and Ti as raw materials.

<Sample 74>

The cBN sintered material of Sample 74 was produced in the same manner as in Sample 67 except that in the first step, the commercially available WC powder, Al powder, and a CoZr atomized powder which were prepared for obtaining a first material raw powder were mixed so that the mass ratio of WC:CoZr:Al was set to 3:5.8:0.7. The CoZr atomized powder was synthesized at a mass ratio of Co:Zr=5.6:0.2 by the above-described method using the gas atomizing method. In order to form a more uniform solid solution, the plasma treatment described above was performed on both the metal powders of Co and Zr as raw materials.

<Sample 75>

The cBN sintered material of Sample 75 was produced in the same manner as in Sample 68 except that in the first step, the commercially available WC powder, Al powder, and a CoHf atomized powder which were prepared for obtaining the first material raw powder were mixed so that the mass ratio of WC:CoHf:Al was set to 3:5.9:0.7. The CoHf atomized powder was synthesized at a mass ratio of Co:Hf=5.6:0.3 by the above-described method using the gas atomizing method. In order to form a more uniform solid solution, the plasma treatment described above was performed on both the metal powders of Co and Hf as raw materials.

<Sample 76>

The cBN sintered material of Sample 76 was produced in the same manner as in Sample 69 except that in the first step, the commercially available WC powder, Al powder, and a CoV atomized powder which were prepared for obtaining a first material raw powder were mixed so that the mass ratio of WC:CoV:Al was set to 3:5.7:0.7. The CoV atomized powder was synthesized at a mass ratio of Co:V=5.6:0.1 by the above-described method using the gas atomizing method. In order to form a more uniform solid solution, the plasma treatment described above was performed on both the metal powders of Co and V as raw materials.

<Sample 77>

The cBN sintered material of Sample 77 was produced in the same manner as in Sample 70 except that in the first step, the commercially available WC powder, Al powder, and a CoNb atomized powder which were prepared for obtaining a first material raw powder were mixed so that the mass ratio of WC:CoNb:Al was set to 3:5.8:0.7. The CoNb atomized powder was synthesized at a mass ratio of Co:Nb=5.6:0.2 by the above-described method using the gas atomizing method. In order to form a more uniform solid solution, the plasma treatment described above was performed on both the metal powders of Co and Nb as raw materials.

<Sample 78>

The cBN sintered material of Sample 78 was produced in the same manner as in Sample 71 except that in the first step, the commercially available WC powder, Al powder, and CoTa atomized powder which were prepared for obtaining a first material raw powder were mixed so that the mass ratio of WC:CoTa:Al was set to 3:5.9:0.7. The CoTa atomized powder was synthesized at a mass ratio of Co:Ta=5.6:0.3 by the above-described method using the gas atomizing method. In order to form a more uniform solid solution, the plasma treatment described above was performed on both the metal powders of Co and Ta as raw materials.

<Sample 79>

The cBN sintered material of Sample 79 was produced in the same manner as in Sample 72 except that in the first step, the commercially available WC powder, Al powder, and a CoMo atomized powder which were prepared for obtaining a first material raw powder were mixed so that the mass ratio of WC:CoMo:Al was set to 3:5.9:0.7. The CoMo atomized powder was synthesized at a mass ratio of Co:Mo=5.6:0.3 by the above-described method using the gas atomizing method. In order to form a more uniform solid solution, the plasma treatment described above was performed on both the metal powders of Co and Mo as raw materials.

<Sample 80>

The cBN sintered material of Sample 80 was produced in the same manner as in Sample 60 except that in the first step, the commercially available WC powder, Al powder, and a CoCr atomized powder which were prepared for obtaining a first material raw powder were mixed so that the mass ratio of WC:CoCr:Al was set to 3:5.7:0.7. The CoCr atomized powder was synthesized at a mass ratio of Co:Cr=5.6:0.1 by the above-described method using the gas atomizing method. In order to form a more uniform solid solution, the plasma treatment described above was performed on both the metal powders of Co and Cr as raw materials.

[Evaluation]

<Content of cBN and Al Solid Solution Amount in Second Material>

For each of the cBN sintered materials of Samples 1 to 80, the cBN content (vol %), and the Al solid solution amount (atom %) in the second material were determined based on the measurement method described above. The results are shown in Tables 1 to 4. In Tables 1 to 4, the type of the second material in each of the samples is also shown.

<$I_a/I_{BN}$>

For each of the cBN sintered materials of Samples 1 to 80, $I_a/I_{BN}$ was determined based on the measurement method described above. The results are shown in Tables 1 to 4.

<Average Grain Size ($D_{50}$) of Second Material>

For each of the cBN sintered materials of Samples 1 to 80, the average grain size of the second material was determined based on the measurement method described above.

The results are shown in Tables 1 to 4.

<Crystal Structure of Second Material>

For each of the cBN sintered materials of Samples 1 to 80, the crystal structure was examined based on the measurement method described above, it was confirmed that the second material had a sodium chloride-type crystal structure in all of the samples including the second material except for Sample 30.

<Oxygen Amount>

For each of the cBN sintered materials of Samples 1 to 80, the oxygen amount (mass %) in the cBN sintered material was determined based on the measurement method described above. The results are shown in Tables 1 to 4.

<Type and Solid Solution Amount of Third Metallic Element or Fourth Metallic Element Dissolved in Solid State in Both or One of First Material and Second Material>

For each of the cBN sintered materials of Samples 41 to 59 and Samples 60 to 80, the type and the solid solution amount of the third metallic element or the fourth metallic element dissolved in the solid state in both or one of the first material and the second material were determined based on the measurement method described above (analysis using the TEM-EDX). Sample 47 and Samples 51 to 54 are Examples in which the second metallic element and the fourth metallic element are identical with each other. In this case, since the second metallic element and the fourth metallic element are similarly dissolved in the solid state as the second material, an effect by adding the fourth metallic element is not recognized.

<First Cutting Test: Cutting Test on Sintered Alloy>

A cutting tool (base material shape: TNGA160404, cutting edge treatment T01225) for each of the samples was produced from the respective cBN sintered materials of Samples 1 to 59 described above. Using this cutting tool, a cutting test (first cutting test) was carried out under the following cutting conditions.

<Cutting Conditions>

Cutting speed: 200 m/min.
Feed speed: 0.1 mm/rev.
Cutting depth: 0.1 mm

Coolant: DRY
Cutting method: end face continuous cutting
Lathe: LB4000 (manufactured by Okuma Corporation)
Workpiece: cylindrical sintered part (hardened sintered alloy D40 manufactured by Sumitomo Electric Industries, Ltd., hardness of quenched end face cut portion: HRB75).

The cutting edge was observed at every 0.5 km of a cutting distance to measure an amount of flank wear. The cutting distance at which the amount of flank wear became 200 μm or more was measured. The cutting distance was taken as a tool life of the cutting tool. The results are shown in Tables 1 to 3. It can be evaluated that the longer the cutting distance is, the longer the tool life of the cutting tool is.

<Second Cutting Test: Cutting Test on Cast Iron>

A cutting tool (base material shape: SNGN090308LE, holder: RM3080R, SNGN090308, cutting edge treatment T01225) for each of the samples was prepared from each of the respective cBN sintered materials of Samples 1 to 59. Using this cutting tool, a cutting test (second cutting test) was carried out under the following cutting conditions.

<Cutting Conditions>
Cutting speed: 1500 m/min
Feed speed: 0.15 mm/rev. .
Cutting depth: 0.4 mm
Coolant: WET
Coolant liquid: Emulsion 96 (diluted 20 times with water)
Cutting method: intermittent cutting
Lathe: NEXUS 530-II HS (manufactured by Yamazaki Mazak Corporation)
Workpiece: Two sheets of FC250 perlite plate (cast iron) were simultaneously machined.

The cutting edge was observed at every 0.5 km of a cutting distance to measure an amount of flank wear. The amount of flank wear was defined as a reduced width due to wear from the position of a cutting edge ridge line before cutting. In a case of breakage, the size of breakage was taken as an amount of falling. The time when the amount of flank wear became 0.1 mm or more was regarded as a tool life of the cutting tool, and the volume (unit: $cm^3$) of the cast iron removed at that time was measured. The results are shown in Tables 1 to 3. It can be evaluated that the cutting tool has a longer tool life as the volume of the cast iron removed by cutting is larger.

TABLE 1

| Sample No. | cBN Content vol % | Main Component of Second Material | Al Solid Solution Amount at % | $I_a/I_{BN}$ | Average Grain Diameter of Second Material | Oxygen Amount mass % | Sintered Alloy Cutting Distance [km] | Cast Iron Removed Volume [$cm^3$] |
|---|---|---|---|---|---|---|---|---|
| 1 | 90 | TiN | 5 | 0.05 | 0.3 μm | 1.1 | 4 | 600 |
| 2 | 90 | ZrN | 5 | 0.05 | 0.3 μm | 1.1 | 3.9 | 595 |
| 3 | 90 | HfN | 5 | 0.05 | 0.3 μm | 1.1 | 3.8 | 590 |
| 4 | 90 | VN | 5 | 0.05 | 0.3 μm | 1.1 | 4 | 599 |
| 5 | 90 | NbN | 5 | 0.05 | 0.3 μm | 1.1 | 4 | 598 |
| 6 | 90 | TaN | 5 | 0.05 | 0.3 μm | 1.1 | 3.9 | 597 |
| 7 | 90 | CrN | 5 | 0.05 | 0.3 μm | 1.1 | 4 | 605 |
| 8 | 90 | TiC | 5 | 0.05 | 0.3 μm | 1.1 | 3.9 | 597 |
| 9 | 90 | ZrC | 5 | 0.05 | 0.3 μm | 1.1 | 3.8 | 596 |
| 10 | 90 | HfC | 5 | 0.05 | 0.3 μm | 1.1 | 3.7 | 595 |
| 11 | 90 | VC | 5 | 0.05 | 0.3 μm | 1.1 | 3.9 | 600 |
| 12 | 90 | NbC | 5 | 0.05 | 0.3 μm | 1.1 | 4 | 600 |
| 13 | 90 | TaC | 5 | 0.05 | 0.3 μm | 1.1 | 3.8 | 597 |
| 14 | 90 | TiCN | 5 | 0.05 | 0.3 μm | 1.1 | 3.9 | 596 |
| 15 | 90 | ZrCN | 5 | 0.05 | 0.3 μm | 1.1 | 3.7 | 596 |
| 16 | 90 | HfCN | 5 | 0.05 | 0.3 μm | 1.1 | 4 | 600 |
| 17 | 90 | VCN | 5 | 0.05 | 0.3 μm | 1.1 | 3.9 | 599 |
| 18 | 90 | NbCN | 5 | 0.05 | 0.3 μm | 1.1 | 3.8 | 599 |
| 19 | 90 | TaCN | 5 | 0.05 | 0.3 μm | 1.1 | 3.7 | 598 |

TABLE 2

| Sample No. | cBN Content vol % | Main Component of Second Material | Al Solid Solution Amount at % | $I_a/I_{BN}$ | Average Grain Size of Second Material | Oxygen Amount mass % | Sintered Alloy Cutting Distance [km] | Cast iron Removed Volume [$cm^3$] |
|---|---|---|---|---|---|---|---|---|
| 20 | 90 | TiN | 3 | 0.05 | 0.3 μm | 1.1 | 4.1 | 602 |
| 21 | 90 | TiN | 0.1 | 0.05 | 0.3 μm | 1.1 | 4 | 601 |
| 22 | 90 | TiN | 7 | 0.05 | 0.3 μm | 1.1 | 3.2 | 580 |
| 23 | 90 | TiN | 10 | 0.05 | 0.3 μm | 1.1 | 3 | 550 |
| 24 | 90 | TiN | 15 | 0.05 | 0.3 μm | 1.1 | 1.1 | 100 |
| 25 | 90 | CrN | 3 | 0.05 | 0.3 μm | 1.1 | 4 | 590 |
| 26 | 90 | CrN | 0.1 | 0.05 | 0.3 μm | 1.1 | 4 | 590 |
| 27 | 90 | CrN | 7 | 0.05 | 0.3 μm | 1.1 | 3.5 | 575 |
| 28 | 90 | CrN | 10 | 0.05 | 0.3 μm | 1.1 | 3 | 555 |
| 29 | 90 | CrN | 15 | 0.05 | 0.3 μm | 1.1 | 0.9 | 109 |
| 30 | 100 | — | 0 | — | — | 1.1 | 0.8 | 108 |
| 31 | 99 | CrN | 3 | 0.05 | 0.3 μm | 1.1 | 3.5 | 597 |
| 32 | 95 | CrN | 3 | 0.05 | 0.3 μm | 1.1 | 4 | 598 |
| 33 | 80 | CrN | 3 | 0.05 | 0.3 μm | 1.1 | 4 | 598 |
| 34 | 72 | CrN | 3 | 0.05 | 0.3 μm | 1.1 | 3.1 | 580 |

TABLE 2-continued

| Sample No. | cBN Content vol % | Main Component of Second Material | Al Solid Solution Amount at % | $I_d/I_{BN}$ | Average Grain Size of Second Material | Oxygen Amount mass % | Sintered Alloy Cutting Distance [km] | Cast iron Removed Volume [cm³] |
|---|---|---|---|---|---|---|---|---|
| 35 | 69 | CrN | 3 | 0.05 | 0.3 μm | 1.1 | 1 | 99 |
| 36 | 90 | CrN | 3 | 0.2 | 0.3 μm | 1.1 | 4.5 | 630 |
| 37 | 90 | CrN | 3 | 0.01 | 0.3 μm | 1.1 | 4.5 | 625 |
| 38 | 90 | CrN | 3 | 0.3 | 0.3 μm | 1.1 | 3.5 | 610 |
| 39 | 90 | CrN | 3 | 0.001 | 0.3 μm | 1.1 | 3.4 | 608 |
| 40 | 90 | CrN | 3 | 0.4 | 0.3 μm | 1.1 | 3.1 | 599 |

TABLE 3

| Sample No. | cBN Content vol % | Main Component of Second Material | Al Solid Solution Amount at % | $I_d/I_{BN}$ | Average Grain Size of Second Material | Forth Metallic Element in First Material/Second Material | Solid Solution Amount of Forth Metallic Element in First Material at % | Solid Solution Amount of Forth Metallic Element in Second Material at % | Oxygen Amount mass % | Sintered Alloy Cutting Distance [km] | Cast iron Removed Volume [cm³] |
|---|---|---|---|---|---|---|---|---|---|---|---|
| 41 | 90 | CrN | 3 | 0.2 | 0.3 μm | Ti | 8 | 3 | 1.1 | 4.8 | 634 |
| 42 | 90 | CrN | 3 | 0.2 | 0.3 μm | Zr | 8 | 3 | 1.1 | 4.7 | 633 |
| 43 | 90 | CrN | 3 | 0.2 | 0.3 μm | Hf | 8 | 3 | 1.1 | 4.6 | 632 |
| 44 | 90 | CrN | 3 | 0.2 | 0.3 μm | V | 8 | 3 | 1.1 | 4.8 | 634 |
| 45 | 90 | CrN | 3 | 0.2 | 0.3 μm | Nb | 8 | 3 | 1.1 | 4.7 | 633 |
| 46 | 90 | CrN | 3 | 0.2 | 0.3 μm | Ta | 8 | 3 | 1.1 | 4.6 | 632 |
| 47 | 90 | CrN | 3 | 0.2 | 0.3 μm | Cr | 8 | 3 | 1.1 | 4.8 | 634 |
| 48 | 90 | CrN | 3 | 0.2 | 0.3 μm | Mo | 8 | 3 | 1.1 | 4.7 | 633 |
| 49 | 90 | CrN | 3 | 0.2 | 0.3 μm | W | 8 | 3 | 1.1 | 4.6 | 632 |
| 50 | 90 | CrN | 3 | 0.2 | 0.3 μm | Ti | 5 | 2 | 1.1 | 4.9 | 640 |
| 51 | 90 | CrN | 3 | 0.2 | 0.3 μm | Cr | 5 | 2 | 1.1 | 5 | 641 |
| 52 | 90 | CrN | 3 | 0.2 | 0.3 μm | Cr | 5 | 2 | 0.9 | 5.5 | 650 |
| 53 | 90 | CrN | 3 | 0.2 | 0.3 μm | Cr | 5 | 2 | 0.6 | 6 | 660 |
| 54 | 90 | CrN | 3 | 0.2 | 0.3 μm | Cr | 5 | 2 | 1.8 | 4.8 | 639 |
| 55 | 90 | CrN | 5 | 0.05 | 2 μm | — | — | — | 1.1 | 1.3 | 104 |
| 56 | 90 | CrN | 3 | 0.2 | 0.3 μm | Zr | 8 | 0 | 1.1 | 4.5 | 632 |
| 57 | 90 | CrN | 3 | 0.2 | 0.3 μm | Zr | 0 | 3 | 1.1 | 4.5 | 632 |
| 58 | 90 | CrN | 3 | 0.2 | 0.3 μm | Zr | 5 | 0 | 1.1 | 4.55 | 633 |
| 59 | 90 | CrN | 3 | 0.2 | 0.3 μm | Zr | 0 | 0.5 | 1.1 | 4.55 | 633 |

<Third Cutting Test: Intermittent Cutting Test on Sintered Alloy>

A cutting tool (base material shape: CNGA120408, cutting edge treatment T01225) for each of the samples was produced from the respective cBN sintered materials of Samples 60 to 80 and Sample 55. Using this cutting tool, an intermittent cutting test (third cutting test) was performed under the following cutting conditions.

<Cutting Conditions>
Cutting speed: 180 m/min.
Feed speed: 0.1 mm/rev.
Cutting depth: 0.15 mm
Coolant: DRY
Coolant liquid: Emulsion 96 (diluted 20 times with water)
Cutting method: intermittent cutting
LB4000 (manufactured by Okuma Corporation)
Workpiece: high-strength sintered alloy (FLA-07C2M equivalent) end face, four screw holes.

The cutting edge was observed at every 0.5 km of a cutting distance to confirm whether or not breakage (chipping with a size of 100 μm or more in the cutting edge was defined as "breakage") occurred. The time when the cutting tool was chipped was regarded as a tool life of the cutting tool, and the cutting distance up to that time was measured. The results are shown in Table 4. It can be evaluated that the longer the cutting distance, the longer the tool life of the cutting tool.

TABLE 4

| Sample No | cBN Content vol % | Main Component of Second Material | Al Solid Solution Amount at % | $I_a/I_{BN}$ | Average Grain Diameter of Second Material | Third Metallic Element in First Material/ Second Material | Solid Solution Amount of Third Metallic Element in First Material at % | Solid Solution Amount of Third Metallic Element in Second Material at % | Oxygen Amount mass % | Sintered Alloy Cutting Distance [km] |
|---|---|---|---|---|---|---|---|---|---|---|
| 60 | 90 | CrN | 3 | 0.2 | 0.3 μm | Cr | 50 | 0 | 1.1 | 5.5 |
| 61 | 90 | CrN | 3 | 0.2 | 0.3 μm | Cr | 37 | 0 | 1.1 | 6.5 |
| 62 | 90 | CrN | 3 | 0.2 | 0.3 μm | Cr | 30 | 0 | 1.1 | 6 |
| 63 | 90 | CrN | 3 | 0.2 | 0.3 μm | Cr | 20 | 0 | 1.1 | 6 |
| 64 | 90 | CrN | 3 | 0.2 | 0.3 μm | Cr | 11 | 0 | 1.1 | 5.5 |
| 65 | 90 | CrN | 3 | 0.2 | 0.3 μm | Cr | 60 | 0 | 1.1 | 5 |
| 66 | 90 | CrN | 3 | 0.2 | 0.3 μm | Ti | 37 | 0 | 1.1 | 6.5 |
| 67 | 90 | CrN | 3 | 0.2 | 0.3 μm | Zr | 37 | 0 | 1.1 | 6 |
| 68 | 90 | CrN | 3 | 0.2 | 0 3 μm | Hf | 37 | 0 | 1.1 | 6 |
| 69 | 90 | CrN | 3 | 0.2 | 0.3 μm | V | 37 | 0 | 1.1 | 6 |
| 70 | 90 | CrN | 3 | 0.2 | 0.3 μm | Nb | 37 | 0 | 1.1 | 6 |
| 71 | 90 | CrN | 3 | 0.2 | 0.3 μm | Ta | 37 | 0 | 1.1 | 6 |
| 72 | 90 | CrN | 3 | 0.2 | 0.3 μm | Mo | 37 | 0 | 1.1 | 6 |
| 73 | 90 | CrN | 3 | 0.2 | 0.3 μm | Ti | 5 | 0 | 1.1 | 5 |
| 74 | 90 | CrN | 3 | 0.2 | 0.3 μm | Zr | 5 | 0 | 1.1 | 5 |
| 75 | 90 | CrN | 3 | 0.2 | 0.3 μm | Hf | 5 | 0 | 1.1 | 4.5 |
| 76 | 90 | CrN | 3 | 0.2 | 0.3 μm | V | 5 | 0 | 1.1 | 5 |
| 77 | 90 | CrN | 3 | 0.2 | 0.3 μm | Nb | 5 | 0 | 1.1 | 5 |
| 78 | 90 | CrN | 3 | 0.2 | 0.3 μm | Ta | 5 | 0 | 1.1 | 4.5 |
| 79 | 90 | CrN | 3 | 0.2 | 0.3 μm | Mo | 5 | 0 | 1.1 | 5 |
| 80 | 90 | CrN | 3 | 0.2 | 0.3 μm | Cr | 5 | 0 | 1.1 | 5 |
| 55 | 90 | CrN | 5 | 0.05 | 2 μm | — | — | — | 1.1 | 0.5 |

[Discussion]

According to Tables 1 to 3, it is understood that the cutting tools obtained from the cBN sintered materials of Samples 1 to 23, Samples 25 to 28, Samples 31 to 34, Samples 36 to 54, and Samples 56 to 59 as Examples have better results in the first cutting test and the second cutting test and have longer tool lives than the cutting tools obtained from the cBN sintered materials of Sample 24, Samples 29 to 30, Sample 35, and Sample 55 as Comparative Examples.

According to Table 4, it is understood that the cutting tools obtained from the cBN sintered materials of Samples 60 to 80 as Examples have better results in the third cutting test and longer tool lives than the cutting tool obtained from the cBN sintered material of Sample 55 as Comparative Example. That is, it is understood that when the third metallic element is dissolved in the solid state in the first material in an amount of more than 10 atom % and 50 atom % or less, the breakage resistance is significantly improved.

Although the embodiments and Examples according to the present disclosure have been described above, it is originally intended that the configurations of the embodiments and Examples described above be appropriately combined.

It should be understood that the embodiment and Example disclosed in the present disclosure are illustrative and non-restrictive in every respect. The scope of the present invention is defined by the terms of the claims rather than the embodiments and Examples described above, and is intended to include any modifications within the scope and meaning equivalent to the terms of the claims.

The invention claimed is:

1. A cubic boron nitride sintered material comprising 72 vol % or more and less than 100 vol % of cubic boron nitride and a binder,
   wherein the binder includes a first chemical species and a second chemical species,
   the first chemical species is at least one type selected from the group consisting of a metal, alloy, intermetallic compound, compound, and solid solution, including at least one first metallic element selected from the group consisting of tungsten, cobalt, and aluminum,
   the second chemical species is a solid solution derived from at least one selected from the group consisting of nitride, carbide, and carbonitride, including at least one second metallic element selected from the group consisting of titanium, zirconium, hafnium, vanadium, niobium, tantalum, and chromium,
   in each of the second chemical species, 0.1 atom % to 10 atom % of aluminum is dissolved in a solid state, and
   the second chemical species is grains having an average grain size of 1 μm or less.

2. The cubic boron nitride sintered material according to claim 1, wherein in each of the second chemical species, 0.1 atom % to 7 atom % of aluminum is dissolved in the solid state.

3. The cubic boron nitride sintered material according to claim 1, wherein in each of the second chemical species, 0.1 atom % to 5 atom % of aluminum is dissolved in the solid state.

4. The cubic boron nitride sintered material according to claim 1, wherein the cubic boron nitride sintered material is configured such that, where an X-ray diffraction method is used to measure an X-ray diffraction intensity of the cubic boron nitride sintered material to provide results and, in a graph of the results in which a horizontal axis represents 2θ and an vertical axis represents a relative intensity,
   in the cubic boron nitride sintered material, a peak IBN of the relative intensity in a (111) plane of the cubic boron nitride and a peak $I_a$ of the relative intensity in a (111) plane of the second material satisfy the following relational expression:

$$0.001 \leq I_a/I_{BN} \leq 0.3.$$

5. The cubic boron nitride sintered material according to claim 1, wherein the cubic boron nitride sintered material is configured such that, where an X-ray diffraction method is used to measure an X-ray diffraction intensity of the cubic boron nitride sintered material to provide results and, in a graph of the results in which an horizontal axis represents 2θ and an vertical axis represents a relative intensity, in the cubic boron nitride sintered material, a peak $I_{BN}$ of the relative intensity in a (111) plane of the cubic boron nitride and a peak $I_a$ of the relative intensity in a (111) plane of the second material satisfy the following relational expression:

$0.01 \leq I_a/I_{BN} \leq 0.2$.

6. The cubic boron nitride sintered material according to claim 1, wherein in each of the first chemical species, more than 10 atom % and 50 atom % or less of at least one third metallic element selected from the group consisting of titanium, zirconium, hafnium, vanadium, niobium, tantalum, chromium, and molybdenum is dissolved in the solid state.

7. The cubic boron nitride sintered material according to claim 1, wherein, in each of the first chemical species, 20 atom % to 45 atom % of at least one third metallic element selected from the group consisting of titanium, zirconium, hafnium, vanadium, niobium, tantalum, chromium, and molybdenum is dissolved in the solid state.

8. The cubic boron nitride sintered material according to claim 1, wherein each of the first chemical species is a solid solution, and in each of the first chemical species, 0.1 atom % to 10 atom % of at least one fourth metallic element selected from the group consisting of titanium, zirconium, hafnium, vanadium, niobium, tantalum, chromium, molybdenum, and tungsten is dissolved in the solid state.

9. The cubic boron nitride sintered material according to claim 1, wherein in each of the second chemical species, 0.1 atom % to 5 atom % of at least one fourth metallic element selected from the group consisting of titanium, zirconium, hafnium, vanadium, niobium, tantalum, chromium, molybdenum, and tungsten is dissolved in the solid state.

10. The cubic boron nitride sintered material according to claim 1, wherein each of the first chemical species is a solid solution, in each of the first chemical species, 0.2 atom % to 5 atom % of at least one fourth metallic element selected from the group consisting of titanium, zirconium, hafnium, vanadium, niobium, tantalum, chromium, molybdenum, and tungsten is dissolved in the solid state, and in each of the second chemical species, 0.2 atom % to 3 atom % of the fourth metallic element is dissolved in the solid state.

11. The cubic boron nitride sintered material according to claim 1, wherein the cubic boron nitride sintered material contains 1.5 mass % or less of oxygen.

12. The cubic boron nitride sintered material according to claim 1, wherein the cubic boron nitride sintered material contains 0.7 mass % or less of oxygen.

13. The cubic boron nitride sintered material according to claim 1, wherein the cubic boron nitride sintered material contains 80 vol % to 95 vol % of the cubic boron nitride.

14. A cutting tool comprising the cubic boron nitride sintered material according to claim 1.

* * * * *